(12) United States Patent
Nagai et al.

(10) Patent No.: US 8,604,140 B2
(45) Date of Patent: Dec. 10, 2013

(54) METHOD FOR PREVENTING FOULING IN CHEMICAL EQUIPMENT AND ANTIFOULING AGENT

(75) Inventors: Naoshi Nagai, Chiba (JP); Shiro Nakatsuka, Kawasaki (JP); Kazuoki Nakai, Ichihara (JP); Kenji Sugimura, Iwakuni (JP); Yasushi Tohi, Otake (JP); Ken Yoshitsugu, Otake (JP); Hideki Bando, Ichihara (JP); Yasuyuki Harada, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/258,554

(22) PCT Filed: Mar. 31, 2010

(86) PCT No.: PCT/JP2010/055948
§ 371 (c)(1),
(2), (4) Date: Nov. 18, 2011

(87) PCT Pub. No.: WO2010/114069
PCT Pub. Date: Oct. 7, 2010

(65) Prior Publication Data
US 2012/0095167 A1  Apr. 19, 2012

(30) Foreign Application Priority Data
Apr. 1, 2009 (JP) .................. 2009-089424

(51) Int. Cl.
*C08F 210/16* (2006.01)
*C08G 65/329* (2006.01)
*C08L 71/02* (2006.01)
*C10G 75/04* (2006.01)

(52) U.S. Cl.
USPC .......................................................... 526/74

(58) Field of Classification Search
USPC .......................................................... 526/74
See application file for complete search history.

(56) References Cited

U.S. PATENT DOCUMENTS

| | | | | |
|---|---|---|---|---|
| 4,689,366 A | * | 8/1987 | Hoefer | 524/724 |
| 5,288,814 A | * | 2/1994 | Long et al. | 525/450 |
| 6,527,816 B2 | | 3/2003 | Deflort et al. | |
| 6,538,067 B1 | * | 3/2003 | Zeitz et al. | 525/184 |
| 2006/0241252 A1 | | 10/2006 | Nishida et al. | |
| 2007/0154431 A1 | | 7/2007 | Nagai et al. | |
| 2010/0280198 A1 | * | 11/2010 | Bartley et al. | 526/89 |

FOREIGN PATENT DOCUMENTS

| | | |
|---|---|---|
| JP | 2000-313717 | 11/2000 |
| JP | 2001-206887 | 7/2001 |
| JP | 2002-220581 | 8/2002 |
| JP | 2005-48175 | 2/2005 |
| JP | 2005-213369 | 8/2005 |

OTHER PUBLICATIONS

International Search Report Dated Jul. 20, 2010.

* cited by examiner

*Primary Examiner* — Jeffrey Mullis
(74) *Attorney, Agent, or Firm* — Rankin, Hill & Clark LLP

(57) ABSTRACT

The invention provides a method for preventing fouling in chemical equipment, comprising adding an antifouling agent which comprises a polyoxyalkylene polymer having Mn of 30,000 or less to a component in the chemical equipment.

11 Claims, 5 Drawing Sheets

METHOD FOR PREVENTING FOULING IN CHEMICAL EQUIPMENT AND ANTIFOULING AGENT

TECHNICAL FIELD

The present invention relates to a method for preventing fouling in chemical equipment and antifouling agent.

BACKGROUND ART

In chemical equipment such as a petroleum distillation and refinery plant, a polyolefin manufacturing plant (equipment for producing polyolefin) and the like, problems such as reduction of heat-exchange capability of the plant, blockage of pipes, or the like may occur due to fouling. These problematic phenomena are desired to be avoided since manufacturing operation may become unstable and, in the worst case, may fall into shutdown thereby.

In particular, various known methods such as a liquid-phase polymerization, a gas-phase polymerization and the like are used in a polyolefin production process. (Co)polymers are obtained in a form of powder in a gas-phase polymerization. Also in a liquid-phase polymerization, the obtained (co)polymers are often collected in a form of powder, because of the ease in handling. (The term "(co)polymer" herein encompasses both a homopolymer and a copolymer, and this definition is also applied to the below).

Thus, a polymer powder is desired to have an excellent fluidity in a closed space in which the polymer powder exists (e.g., a polymerization reaction vessel or pipes for producing a polymer powder in a gas-phase polymerization, a storage facility for storing a polymer powder which is obtained in a liquid-phase polymerization or a gas-phase polymerization, etc.) without causing fouling.

Polyolefins such as polyethylene, polypropylene, ethylene/α-olefin copolymers, and propylene/α-olefin copolymers are produced by (co)polymerizing olefins in the presence of a solid catalyst such as a solid titanium catalyst or a carrier-supported metallocene catalyst. These solid catalysts often have a low fluidity and may be hardly fed into a polymerization vessel. Such problems can be improved to some extent by having a surfactant be supported on the solid catalysts, but this may cause a problem of reduction of the polymerization activity.

When gas-phase polymerization of olefins is carried out in the presence of the solid catalyst, the mixing state in the fluidized bed may become nonhomogeneous due to generation of polymer lumps, sheet-like matters or the like in a fluidized bed, or reduction of the fluidity of polyolefin powder, which may cause problems such as inhibiting a long-term stable operation.

In addition, various subsequent processes may be interrupted by formation of bridges in a storage facility or the like for collecting and/or storing the finally obtained polymer powders due to occurence of bonding of polymer powders caused by reduction of fluidity of the polymer powders in the storage facility.

With respect to these issues, Japanese Patent Application Laid-Open (JP-A) No. 2000-313717 discloses a method comprising adding a higher aliphatic amide into a powder flowing environment field in polyolefin production.

JP-A No. 2005-48175 discloses a method for preventing fouling in a heat exchanger by a method comprising adding a nonionic surfactant into a component in chemical equipment.

DISCLOSURE OF THE INVENTION

Problems to be Solved by the Invention

However, it was found that reduction of the catalytic activity may occur in the method including adding a higher aliphatic amide described in JP-A No. 2000-313717.

The effect of preventing fouling by the method described in JP-A No. 2005-48175 is insufficient.

The present invention was made in view of the above. The present invention intends to accomplish the following object.

That is, an object of the present invention is to provide a method for preventing fouling in chemical equipment, which can prevent fouling in chemical equipment (e.g., equipment for producing polyolefin (e.g., a polymerization reaction vessel for producing a polymer powder, pipes, a storage facility for storing the polymer powder, etc.)) and which has little adverse effect on the activity of a catalyst to be used in a process, an antifouling agent and a composition which comprises the antifouling agent.

Means for Solving the Problems

The present inventors intensively studied in order to prevent fouling in chemical equipment (e.g., equipment for producing polyolefin) and found that a specific polyoxyalkylene polymer exhibits an excellent effect as an antifouling agent, and addition of the specific polyoxyalkylene polymer into chemical equipment can efficiently prevent fouling in the chemical equipment, namely reduction of the performance of the chemical equipment may be suppressed so that a long-term stable operation can be achieved without sacrificing production rate, and further that there is little adverse effect on an olefin-producing catalytic activity in polyolefin manufacturing, thereby completing the present invention.

Specific means for solving the problems are as follows.

<1> A method for preventing fouling in chemical equipment, comprising adding an antifouling agent which comprises a polyoxyalkylene polymer represented by the following general formula (1) or the following general formula (13) and having a number average molecular weight of 30,000 or less to a component in the chemical equipment,

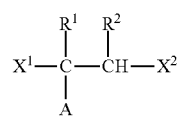

(1)

wherein, in the general formula (1), A represents a group to which olefins having 2 to 20 carbon atoms are homopolymerized or copolymerized and which has a number average molecular weight of from 140 to 10,000; $R^1$ and $R^2$ each represents a hydrogen atom or an alkyl group having 1 to 18 carbon atoms; and $X^1$ and $X^2$, which may be the same or different, each represents a group represented by the following general formula (2) or the following general formula (4):

$$-E-X^3 \qquad (2)$$

wherein, in the general formula (2), E represents an oxygen atom or a sulfur atom; and $X^3$ represents a polyalkylene glycol group or a group represented by the following general formula (3):

(3)

wherein, in the general formula (3), $R^3$ represents a hydrocarbon group having a valency of m+1; G may be the same or different and each represents a group of —$OX^4$ or —$NX^5X^6$, wherein $X^4$, $X^5$, and $X^6$ each represents a polyalkylene glycol group, and m is the bonding number of G and is an integer in a range of from 1 to 10:

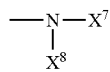 (4)

wherein, in the general formula (4), $X^7$ and $X^8$, which may be the same or different, each represents a polyalkylene glycol group or the group represented by the general formula (3):

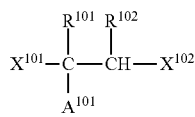 (13)

wherein, in the general formula (13), $A^{101}$ represents a group to which olefins having 2 to 20 carbon atoms are homopolymerized or copolymerized and which has a number average molecular weight of from 500 to 10,000; $R^{101}$ and $R^{102}$ each represents a hydrogen atom or an alkyl group having 1 to 18 carbon atoms; one of $X^{101}$ or $X^{102}$ represents a hydrogen atom, a group represented by the following general formula (14), or a group represented by the following general formula (15), and the other represents a group represented by the following general formula (16):

 (14)

wherein, in the general formula (14), $E^{101}$ represents an oxygen atom or a sulfur atom, and $R^{104}$ represents a hydrogen atom, a hydrocarbon group, or an acyl group:

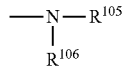 (15)

wherein, in the general formula (15), $R^{105}$ and $R^{106}$, which may be the same or different, each represents a hydrocarbon group:

 (16)

wherein, in the general formula (16), $E^{102}$ represents an oxygen atom or a sulfur atom, and $X^{104}$ represents a polyalkylene glycol group.

<2> The method for preventing fouling of <1>, wherein the chemical equipment is equipment for producing polyolefin and the component in the chemical equipment is a component comprising α-olefin and a solid catalyst for polymerizing olefin.

<3> The method for preventing fouling of <1>, wherein the chemical equipment is equipment for producing polyolefin, the component in the chemical equipment is a component comprising α-olefin, and the antifouling agent is added to the component in the chemical equipment together with a solid catalyst for polymerizing olefin.

<4> The method for preventing fouling of <1>, wherein the chemical equipment is equipment for producing polyolefin, the component in the chemical equipment is a component comprising α-olefin, and a composition comprising the antifouling agent and a solid catalyst for polymerizing olefin is added to the component in the chemical equipment.

<5> The method for preventing fouling of any one of <1> to <4>, wherein the component in the chemical equipment is in a gaseous state.

<6> The method for preventing fouling of any one of <1> to <4>, wherein the component in the chemical equipment is in a liquid state.

<7> The method for preventing fouling of any one of <1> to <6>, wherein the antifouling agent is added in an intermittent manner or in a continuous manner.

<8> The method for preventing fouling of any one of <1> to <7>, wherein $X^1$ or $X^2$ in the general formula (1) is a group represented by the following general formula (5):

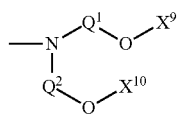 (5)

wherein, in the general formula (5), $X^9$ and $X^{10}$, which may be the same or different, each represents a polyalkylene glycol group; and $Q^1$ and $Q^2$, which may be the same or different, each represents a divalent alkylene group.

<9> The method for preventing fouling of any one of <1> to <7>, wherein $X^1$ and $X^2$ in the general formula (1), each represents a group represented by the following general formula (6):

 (6)

wherein, in the general formula (6), $X^{11}$ represents a polyalkylene glycol group.

<10> The method for preventing fouling of any one of <1> to <9>, wherein the polyoxyalkylene polymer represented by the general formula (1) and having a number average molecular weight of 30,000 or less is a polyoxyalkylene polymer represented by the following general formula (7) and having a number average molecular weight of 30,000 or less:

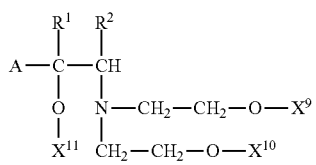 (7)

wherein, in the general formula (7), A represents a group to which olefins having 2 to 20 carbon atoms are homopolymerized or copolymerized and which has a number average molecular weight of from 140 to 10,000; $R^1$ and $R^2$ each represents a hydrogen atom or an alkyl group having 1 to 18 carbon atoms; and $X^9$, $X^{10}$ and $X^{11}$, which may be the same or different, each represents a polyalkylene glycol group.

<11> An antifouling agent comprising a polyoxyalkylene polymer represented by the following general formula (1) or the general formula (13) and having a number average molecular weight of 30,000 or less:

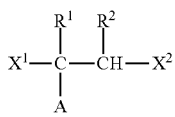 (1)

wherein, in the general formula (1), A represents a group to which olefins having 2 to 20 carbon atoms are homopolymerized or copolymerized and which has a number average molecular weight of from 140 to 10,000; $R^1$ and $R^2$ each represents a hydrogen atom or an alkyl group having 1 to 18 carbon atoms; and $X^1$ and $X^2$, which may be the same or different, each represents a group represented by the following general formula (2) or the following general formula (4):

 (2)

wherein, in the general formula (2), E represents an oxygen atom or a sulfur atom; and $X^3$ represents a polyalkylene glycol group or a group represented by the following general formula (3):

 (3)

wherein, in the general formula (3), $R^3$ represents a hydrocarbon group having a valency of m+1; G may be the same or different and each represents a group of $-OX^4$ or $-NX^5X^6$, wherein $X^4$, $X^5$, and $X^6$ each represents a polyalkylene glycol group, and m is the bonding number of G and is an integer in a range of from 1 to 10:

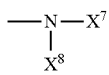 (4)

wherein, in the general formula (4), $X^7$ and $X^8$, which may be the same or different groups, each represents a polyalkylene glycol group or the group represented by the general Formula (3):

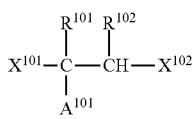 (13)

wherein, in the general formula (13), $A^{101}$ represents a group to which olefins having 2 to 20 carbon atoms are homopolymerized or copolymerized and which has a number average molecular weight of from 500 to 10,000; $R^{101}$ and $R^{102}$ each represents a hydrogen atom or an alkyl group having 1 to 18 carbon atoms; one of $X^{101}$ or $X^{102}$ represents a hydrogen atom, a group represented by the following general formula (14), or a group represented by the following general formula (15), and the other represents a group represented by the following general formula (16):

 (14)

wherein, in the general formula (14), $E^{101}$ represents an oxygen atom or a sulfur atom, and $R^{104}$ represents a hydrogen atom, a hydrocarbon group, or an acyl group:

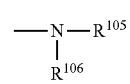 (15)

wherein, in the general formula (15), $R^{105}$ and $R^{106}$, which may be the same or different, each represents a hydrocarbon group:

 (16)

wherein, in the general formula (16), $E^{102}$ represents an oxygen atom or a sulfur atom, and $X^{104}$ represents a polyalkylene glycol group.

<12> The antifouling agent of <11>, wherein $X^1$ or $X^2$ in the general formula (1) is a group represented by the following general formula (5):

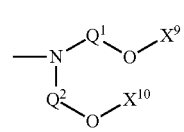 (5)

wherein, in the general formula (5), $X^9$ and $X^{10}$, which may be the same or different, each represents a polyalkylene glycol group; and $Q^1$ and $Q^2$, which may be the same or different, each represents a divalent alkylene group.

<13> The antifouling agent of <11>, wherein, in the general formula (1), $X^1$ and $X^2$ each represents a group represented by the following general formula (6):

 (6)

wherein, in the general formula (6), $X^{11}$ represents a polyalkylene glycol group.

<14> The antifouling agent of any one of <11> to <13>, wherein the polyoxyalkylene polymer represented by the general formula (1) and having a number average molecular weight of 30,000 or less is a polyoxyalkylene polymer represented by the following general formula (7) and having a number average molecular weight of 30,000 or less:

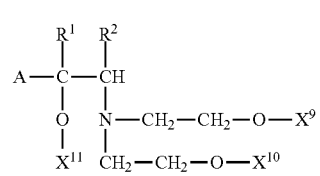 (7)

wherein, in the general formula (7), A represents a group to which olefins having 2 to 20 carbon atoms are homopolymerized or copolymerized and which has a number average molecular weight of from 140 to 10,000; $R^1$ and $R^2$ each represents a hydrogen atom or an alkyl group having 1 to 18 carbon atoms; and $X^9$, $X^{10}$ and $X^{11}$, which may be the same or different, each represents a polyalkylene glycol group.

<15> A composition comprising an antifouling agent of any one of <11> to <14> and a solid catalyst for polymerizing olefin.

Effect of the Invention

According to the invention, there can be provided a method for preventing fouling in chemical equipment, which can prevent fouling in chemical equipment (e.g., equipment for producing polyolefin (e.g., a polymerization reaction vessel for producing a polymer powder, pipes, a storage facility for storing the polymer powder, etc.)) and which may have little adverse effect on the activity of a catalyst to be used in a process, an antifouling agent and a composition comprising the antifouling agent.

BEST MODE FOR CARRYING OUT THE INVENTION

Figure 1:
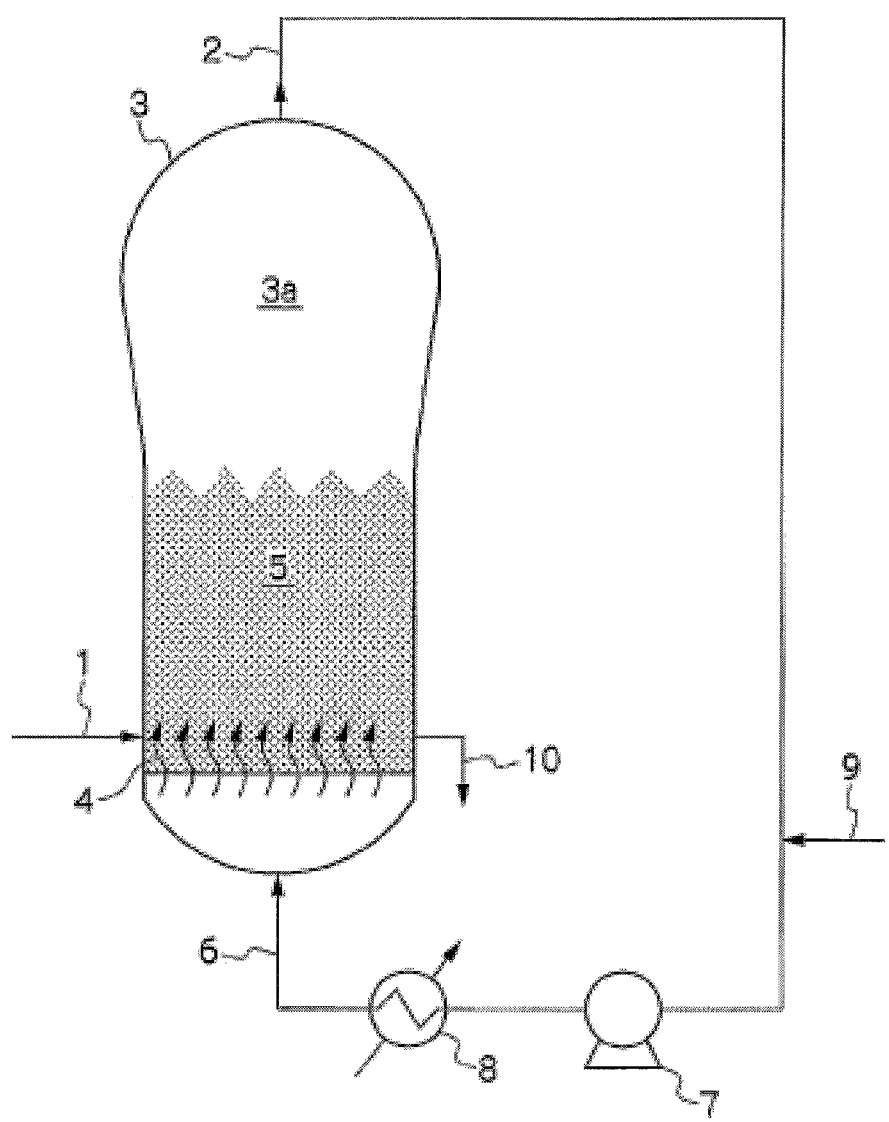
FIG. 1 is a schematic view showing one example of a gas-phase polymerization reactor, which is an exemplary embodiment of equipment for producing polyolefin of the invention.

The antifouling agent of the invention is an antifouling agent comprising a polyoxyalkylene polymer represented by the following general formula (1) or the following general formula (13) and having a number average molecular weight of 30,000 or less.

The composition of the invention is a composition comprising the antifouling agent of the invention and a solid catalyst for polymerizing olefin.

The method for preventing fouling in chemical equipment of the invention is a method comprising adding the antifouling agent of the invention to a component in the chemical equipment.

According to the antifouling agent of the invention, the composition of the invention, and the method for preventing fouling in chemical equipment of the invention, fouling in chemical equipment (e.g., equipment for producing polyolefin (e.g., a polymerization reaction vessel for producing a polymer powder, pipes, a storage facility for storing the polymer powder, etc.)) can be prevented and an adverse effect on the activity of a catalyst to be used in a process can be reduced.

The reason why such effects are obtained has not been clarified, it is guessed that because a polyalkyleneglycol group included in the polymer represented by the general formula (1) or the general formula (13) contributes to a suppression of fouling and a group represented by A or $A^{101}$ contributes to a reduction of the adverse effect on the activity of a catalyst. It is noted that the invention is not limited by this reason.

When a conventional antifouling agent is used, there may be a case that the effect of preventing fouling is insufficient, or an addition of the antifouling agent causes a large decrease of the polymerization catalytic activity even though fouling can be prevented.

In contrast, the antifouling agent and the method for preventing fouling of the invention achieve excellent effect of striking a balance between preventing fouling and retaining the catalytic activity, which had not been able to heretofore.

As described above, the antifouling agent, the composition, and the method for preventing fouling in chemical equipment of the invention can prevent fouling in the chemical equipment, and can reduce an adverse effect on the activity of a catalyst to be used in the process; and therefore, reduction of the performance of the chemical equipment is suppressed, and thus, a long-term stable operation can be performed without sacrificing production speed.

In particular, when the method for preventing fouling in chemical equipment of the invention is applied to an olefin polymerization process, an adverse effect on the polymerization catalytic activity is smaller than that of conventional method for preventing fouling, and therefore, polyolefin production cost can be reduced.

In the invention, the term "fouling" herein refers to a phenomenon in which accumulations and/or depositions occur in chemical equipment.

In particular, in the case where the chemical equipment of the invention is chemical equipment in which gas-phase or liquid-phase polymerization of α-olefins is carried out (equipment for producing polyolefin), the "fouling" refers to a phenomenon in which depositions are generated on the reactor wall, or a phenomenon in which polymer lumps, sheet-like materials and/or the like were generated and adhered on the reactor wall.

In general, in chemical equipment in which gas-phase or liquid-phase polymerization of α-olefins is carried out, a fouling may cause reduction of the fluidity inside the polymerization vessel which leads to nonhomogeneous mixture state or may cause adhering of polymers to a stirring wing which leads to the impossibility of a long-term stable continuous operation. Fouling may further cause decrease of the fluidity when catalysts and/or polymer powders move(s) through various equipment in which polymers move (e.g., pipes connected with a polymerization reaction vessel, etc.). In places where the fluidity in various equipment are decreased (so-called dead space, etc.), the fluidity of the polymer powder may be reduced due to occurrence of polymer lumps and/or deposition of sheet-like material. As a result of these, in the worst case, a problem that these pipes or the like are stuck may occur.

In addition, because of the reduction of fluidity of the polymer powders in a storage facility or the like for collecting or storing the finally obtained polymer powders, problems of interruption of subsequent various processes occur, such as formation of bridges in the storage facility due to bonding occurring between the polymer powders.

In the case where chemical equipment of the invention is chemical equipment which is used in a petroleum refinery process or the like, the "fouling" refers to a phenomenon in which materials are generated by heat denaturation of feedstock oil, particularly in high-temperature regions of a heat exchanger or the like, and adhered or deposited in the petroleum refinery process or the like.

The polyoxyalkylene polymer which is contained in the antifouling agent of the invention will be firstly described below. The antifouling agent, the composition, and the method for preventing fouling in chemical equipment will be described later.

Polyoxyalkylene Polymer

The antifouling agent of the invention comprises a polyoxyalkylene polymer represented by the following general formula (1) or the following general formula (13) having a number average molecular weight of 30,000 or less.

Polyoxyalkylene polymers represented by the general formula (1) and having a number average molecular weight of 30,000 or less First, polyoxyalkylene polymers represented by the general formula (1) and having a number average molecular weight of 30,000 or less (hereinafter also referred to simply as "polyoxyalkylene polymers represented by the general formula (1)") is described below.

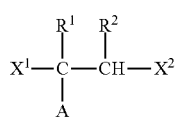
(1)

In the general formula (1), A represents a group to which olefins having 2 to 20 carbon atoms are homopolymerized or copolymerized.

Examples of the olefins having 2 to 20 carbon atoms which are polymerized to form A include α-olefins such as ethylene, propylene, 1-butene, and 1-hexene. Examples of a polymer which corresponds to A include homopolymers or copolymers of these olefins. The polymer corresponding to A may be a polymer which is formed by copolymerizing these olefins with other polymerizable unsaturated compounds, within the range not adversely affecting the properties of these olefins.

Particularly preferable examples among these olefins include ethylene, propylene, and 1-butene.

The number average molecular weight (Mn) of a group represented by A is in a range of from 140 to 10,000, preferably from 140 to 6000, more preferably from 300 to 4000, and particularly preferably from 400 to 2000. When a number average molecular weight (Mn) of a group represented by A is within this range, the affinity of the agent to a polyolefin particularly in an olefin polymerization process is high, and the effect of preventing fouling and the effect of suppressing reduction of the activity tend to be stable, and the melt viscosity is low, and the addition to the chemical equipment tends to become easily. Therefore it is preferable.

In the invention, gel permeation chromatography (hereinafter referred to as "GPC" for abbreviation) is used for measuring a number average molecular weight. A value of a number average molecular weight (Mn) measured by GPC is a value in terms of polystyrene. However, a number average molecular weight is measured by mass spectroscopy when it is within a low-molecular-weight range of not more than 500, in which standard samples cannot be used.

A molecular weight distribution (Mw/Mn), that is a ratio of a weight average molecular weight (Mw) to a number average molecular weight (Mn) measured by GPC, of a group represented by A in the general formula (1) is not particularly limited. It may be in a range of from, for example, from 1.0 to several tens. In view of uniformity of physical properties or the like, it may be preferably in a range of from 1.0 to 4.0, and more preferably in a range of from 1.0 to 3.0.

A molecular weight of a group represented by A may be determined by measuring the molecular weight of polyolefin which has an unsaturated group at one terminal described below, and then subtracting a molecular weight equivalent to the molecular weight of terminal.

$R^1$ and $R^2$ in the general formula (1) each represents a hydrogen atom or a hydrocarbon group having 1 to 18 carbon atoms. Specific examples thereof include a hydrogen atom, a methyl group, an ethyl group, a propyl group, a butyl group, and a hexyl group.

In the general formula (1), $X^1$ and $X^2$, which may be the same or different, each represents a linear or branched polyalkylene glycol-containing group. The number average molecular weights (Mn) of $X^1$ and $X^2$ are respectively in a range of from 50 to 7000, preferably from 60 to 5000, and particularly preferably from 70 to 3000. When number average molecular weights (Mn) of $X^1$ and $X^2$ are within this range, the stability of the effect of preventing fouling and the stability of the effect of suppressing the activity reduction may be excellent.

Exemplary embodiments of branches of the branched polyalkylene glycol group include branches via a multivalent hydrocarbon group, branches via a nitrogen atom, and the like. Specific examples thereof include branches via a hydrocarbon group which is bound to two or more nitrogen atoms, oxygen atoms, or sulfur atoms in addition to the main backbone, and branches via a nitrogen atom which is bound to two alkylene groups in addition to the main backbone.

The number average molecular weights (Mn) of polyoxyalkylene polymers represented by the general formula (1) or the general formula (13) described below are respectively necessarily not more than 30,000, and are respectively preferably equal to or less than 20,000, more preferably in a range of from 550 to 10,000, and particularly preferably in a range of from 800 to 3000.

When the number average molecular weights (Mn) are within this range, the dispersibility of the agent at the time of adding into chemical equipment, the stability of the effect of preventing fouling, and the stability of the effect of suppressing the activity reduction may be excellent.

The number average molecular weight (Mn) of the general formula (1) is represented by the sum of a number average molecular weight of A, number average molecular weights of $X^1$ and $X^2$, and molecular weights of $R^1$, $R^2$ and $C_2H$.

Likewise, the number average molecular weight (Mn) of the general formula (13) described below is represented by the sum of number average molecular weights of groups represented by $A^{101}$ and $X^{101}$ and $X^{102}$, and molecular weights of $R^{101}$, $R^{102}$ and $C_2H$.

Regarding the polyoxyalkylene polymers represented by the general formula (1), preferable examples of $X^1$ and $X^2$, which may be the same or different, each includes groups represented by the following general formula (2) or the following general formula (4).

(2)

In the general formula (2), E represents an oxygen atom or a sulfur atom; and $X^3$ represents a polyalkylene glycol group or a group represented by the following general formula (3).

(3)

In the general formula (3), $R^3$ represents a hydrocarbon group having a valency of m+1; G may be the same or different and represents a group of $-OX^4$ or $-NX^5X^6$ ($X^4$, $X^5$, and $X^6$ each represents a polyalkylene glycol group), and m is the bonding number of G and is an integer in a range of from 1 to 10.

In the general formula (3), a hydrocarbon group having 1 to 20 carbon atoms and having a valency of m+1 is preferable as a group represented by $R^3$.

m represents an integer of from 1 to 10. It is preferably an integer of from 1 to 6, and more preferably an integer of from 1 to 2.

(4)

In the general formula (4), $X^7$ and $X^8$, which may be the same or different, each represents a polyalkylene glycol group or a group represented by the general formula (3).

Preferable examples of polyoxyalkylene polymers represented by the general formula (1) include a polyoxyalkylene polymers in which one of $X^1$ or $X^2$ in the general formula (1) represents a group represented by the general formula (4). More preferable examples include a polyoxyalkylene polymer in which one of $X^1$ or $X^2$ represents a group represented by the general formula (4), and the other represents a group represented by the general formula (2).

Other preferable examples of polyoxyalkylene polymers represented by the general formula (1) include a polyoxyalkylene polymer in which both $X^1$ and $X^2$ in the general formula (1) represent groups represented by the general formula (2).

More preferable examples of the structures of $X^1$ and $X^2$ represented by the general formula (4) include a group represented by the general formula (5).

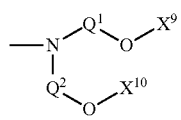

(5)

In the general formula (5), $X^9$ and $X^{10}$, which may be the same or different, each represents a polyalkylene glycol group; and $Q^1$ and $Q^2$, which may be the same or different, each represents a divalent hydrocarbon group.

The divalent hydrocarbon group represented by $Q^1$ or $Q^2$ in the general formula (5) is a hydrocarbon group having 2 to 20 carbon atoms which may or may not have a substituent(s); and examples thereof include an ethylene group, a methylethylene group, an ethylethylene group, a dimethylethylene group, a phenylethylene group, a chloromethylethylene group, a bromomethylethylene group, a methoxymethylethylene group, an aryloxymethylethylene group, a propylene group, a trimethylene group, a tetramethylene group, a hexamethylene group, and a cyclohexylene group. Preferable examples of an alkylene group include alkylene groups of hydrocarbons, particularly preferable examples include an ethylene group and a methylethylene group, and further particularly preferable examples include an ethylene group. $Q^1$ and $Q^2$ may represent one kind of an alkylene group, or may each represents an alkylene group so that two or more alkylene groups exist together.

More preferable structures of $X^1$ and $X^2$ in the general formula (1) include a group represented by the general formula (6).

—O—$X^{11}$ (6)

In the general formula (6), $X^{11}$ represents a polyalkylene glycol group.

The polyalkylene glycol group represented by $X^3$ to $X^{11}$ in the general formula (2) to (6) is a group obtained by addition polymerization of alkylene oxide.

Examples of the alkylene oxide include ethylene oxide, propylene oxide, butylene oxide, styrene oxide, cyclohexene oxide, epichlorohydrin, epibromohydrin, methyl glycidyl ether, and allyl glycidyl ether.

Among these, propylene oxide, ethylene oxide, butylene oxide, or styrene oxide may be preferable; propylene oxide or ethylene oxide may be more preferable; and ethylene oxide may be particularly preferable.

The polyalkylene glycol group represented by any one of $X^3$ to $X^{11}$ may be a group which is obtained by homopolymerization of these alkylene oxides, or may be a group which is obtained by copolymerization of two or more of these alkylene oxides.

Preferable examples of the polyalkylene glycol group include a polyethylene glycol group, a polypropylene glycol group, and a group obtained by copolymerization of polyethylene oxide and polypropylene oxide, and particularly preferable examples thereof include a polyethylene glycol group.

Among polyoxyalkylene polymers represented by the general formula (1), particularly preferable examples thereof include a polyoxyalkylene polymer represented by the general formula (7).

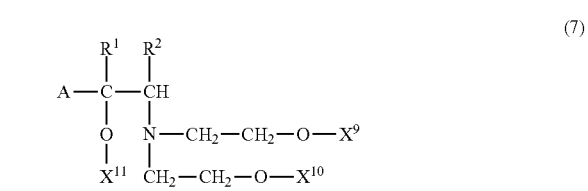

(7)

In the general formula (7), A, $R^1$, $R^2$, $X^9$, $X^{10}$ and $X^{11}$ each represents an atom or a group which has the same definition described above.

Polyoxyalkylene polymer represented by the general formula (13) having a number average molecular weight of 30,000 or less Next, a polyoxyalkylene polymer represented by the general formula (13) having a number average molecular weight of 30,000 or less (hereinafter also referred to simply as "polyoxyalkylene polymer represented by the general formula (13)") is described.

(13)

In the general formula (13), $A^{101}$ represents a group to which olefins having 2 to 20 carbon atoms are homopolymerized or copolymerized and which has a number average molecular weight of from 500 to 10,000; $R^{101}$ and $R^{102}$ each represents a hydrogen atom or an alkyl group having 1 to 18 carbon atoms; one of $X^{101}$ or $X^{102}$ represents a hydrogen atom, a group represented by the following general formula (14), or a group represented by the following general formula (15), and the other represents a group represented by the following general formula (16).

-$E^{101}$-$R^{104}$ (14)

In the general formula (14), $E^{101}$ represents an oxygen atom or a sulfur atom, and $R^{104}$ represents a hydrogen atom, a hydrocarbon group, or an acyl group.

(15)

In the general formula (15), $R^{105}$ and $R^{106}$, which may be the same or different, each represents a hydrocarbon group.

In the general formula (16), $E^{102}$ represents an oxygen atom or a sulfur atom, and $X^{104}$ represents a polyalkylene glycol group.

The polyalkylene glycol group represented by $X^{104}$ has the same definitions and the same preferable ranges as the polyalkylene glycol groups represented by $X^3$ to $X^{11}$ in the general formula (2) to the general formula (6).

Preferable examples of the hydrocarbon group represented by any one of $R^{104}$ to $R^{106}$ in the general formula (14) and the general formula (15) include an alkyl group, an alkenyl group, an aralkyl group, and an aryl group. The hydrocarbon group may be bound to a functional group including a heteroatom.

Preferable examples of the alkyl group include a linear, branched or cyclic alkyl group having 1 to 18 carbon atoms. Examples of the alkyl group include a methyl group, an ethyl group, a propyl group, a butyl group, a pentyl group, a hexyl group, a heptyl group, an octyl group, a cyclopentyl group, a cyclohexyl group, a cyclooctyl group, a dihydroxypropyl group, 2,2-bis(hydroxymethyl)-3-hydroxypropane, a tetradecyl group, an octadecyl group, a cyclopropylmethyl group, a cyclohexylmethyl group, a bromodecyl group, a trifluoroethyl group, a hexafluoro-2-propyl group, and a perfluorooctyl group.

Preferable examples of the alkenyl group include a linear or branched alkenyl group having 2 to 6 carbon atoms. Examples of the alkenyl group include a vinyl group, an allyl group, a fluoroallyl group, an isopropenyl group, a pentenyl group, and a hexenyl group.

Preferable examples of the aralkyl group include an aralkyl group having 7 to 15 carbon atoms. Examples of the aralkyl group include a benzyl group, a difluorobenzyl group, a pentafluorophenylmethyl group, bis(4-methoxyphenyl)methyl group, a phenethyl group, a benzhydryl group, and a phenylpropyl group.

Preferable examples of the aryl group include an aryl group having 6 to 15 carbon atoms. Examples of the aryl group include a phenyl group, a dichlorophenyl group, a methoxyphenyl group, a methoxycarbonylphenyl group, a nitrophenyl group, a hexafluorophenyl group, a tolyl group, a xylyl group, and a naphthyl group.

Preferable examples of the acyl group represented by $R^{104}$ in the general formula (14) include an acyl group having 2 to 15 carbon atoms.

Examples of the acyl group include an acetyl group, a propionyl group, a carboxypropionyl group, a carboxypropenoyl group, an acryloyl group, a methacryloyl group, an octanoyl group, a benzoyl group, a trifluoromethylbenzoyl group, a nitrobenzoyl group, a carboxybenzoyl group, a naphthoyl group, a perfluoroheptanoyl group, and a perfluorooctanoyl group.

In the general formula (13), $R^{101}$ and $R^{102}$ have the same definitions and the same preferable ranges as $R^1$ and $R^2$ in the general formula (1), respectively.

Examples of olefins having 2 to 20 carbon atoms which are polymerized to form $A^{101}$ in the general formula (13) include α-olefins such as ethylene, propylene, 1-butene, and 1-hexene. Examples of polymers corresponding to $A^{101}$ include homopolymers or copolymers of these olefins. The polymers corresponding to $A^{101}$ may be polymers which are formed by copolymerizing olefin with other polymerizable unsaturated compounds, as long as not adversely affecting the properties of these olefins.

Ethylene, propylene, and 1-butene may be particularly preferable among these olefins.

In the general formula (13), the number average molecular weight (Mn) of a group represented by $A^{101}$ is in a range of from 500 to 10,000, preferably in a range of from 500 to 6000, more preferably in a range of from 500 to 4000, and particularly preferably in a range of from 500 to 2000. When a number average molecular weight (Mn) of a group represented by $A^{101}$ is within this range, the affinity to a polyolefin particularly in an olefin polymerization process is high, and the effect of preventing fouling and the effect of suppressing the activity reduction tend to be stable, and, the melt viscosity is low, and the addition of the agent into the chemical equipment tends to become easily and thus preferable.

Methods for producing polyoxyalkylene polymer

The polyoxyalkylene polymer of the invention may be produced by, for example, the following methods or the like.

<Methods for Producing Polyoxyalkylene Polymer Represented by the General Formula (1) and Having a Number Average Molecular Weight of 30,000 or Less>

First, a polyolefin represented by the general formula (8) which has a double bond at one terminal (hereinafter also referred to as "a polyolefins) represented by the general formula (8)") is produced.

In the general formula (8), A, $R^1$ and $R^2$ each represents an atom or a group having the same definitions as those in the general formula (1).

The polyolefin may be produced by the following methods.
(1) A polymerization method, as described in JP-A No. 2000-239312, JP-A No. 2001-2731, JP-A No. 2003-73412, or the like, in which a transition metal compound having a salicylaldimine ligand is used as a polymerization catalyst.
(2) A polymerization method in which a titanium catalyst comprising a titanium compound and an organoaluminum compound is used.
(3) A polymerization method in which a vanadium catalyst comprising a vanadium compound and an organoaluminum compound is used.
(4) A polymerization method in which a Ziegler-type catalyst comprising a metallocene compound such as zirconocene and an organoaluminum oxy compound (aluminoxane) is used.

Among the methods of the above (1) to (4), the method of (1) can particularly provide the polyolefin with a good yield. In the method (1), olefins having 2 to 20 carbon atoms which form A described above may be polymerized or copolymerized in the presence of the transition metal compound having a salicylaldimine ligand to produce the polyolefin which has a double bond at one terminal.

Polymerization of olefins by the method (1) may be carried out by any methods of liquid-phase polymerization such as suspension polymerization and solution polymerization or gas-phase polymerization. Detailed conditions and the like are already known, and the above-described patent documents may be used as references.

A molecular weight of polyolefin obtained by the method (1) may be controlled by making hydrogen to exist in the polymerization system, changing the polymerization temperature, or changing a type of a catalyst to be used.

Next, a polyolefin represented by the general formula (8) is epoxidated, in other words, a double bond at the terminal of the polyolefin is oxidized, to obtain a polymer which contains an epoxy group at a terminal and is represented by the general formula (9).

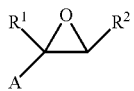 (9)

In the general formula (9), A, $R^1$ and $R^2$ represent atoms or groups which have the same definitions as those in the general formula (1).

The epoxidation method is not limited, and examples thereof include the following methods.
(1) Oxidation by peracid such as performic acid, peracetic acid, or perbenzoic acid
(2) Oxidation by titanosilicate and hydrogen peroxide
(3) Oxidation by rhenium oxide catalyst such as methyltrioxorhenium and hydrogen peroxide
(4) Oxidation by porphyrin complex catalyst such as manganese porphyrin or iron porphyrin and either hydrogen peroxide or hypochlorite
(5) Oxidation by Salen complex such as manganese Salen and hydrogen peroxide or hypochlorite
(6) Oxidation by TACN complex such as manganese-triaza-cyclononane (TACN) complex and hydrogen peroxide
(7) Oxidation by hydrogen peroxide which is carried out in the presence of VI group transition metal catalyst such as a tungsten compound and phase transfer catalyst Among the methods of the above (1) to (7), the methods (1) and (7) may be specifically preferable in terms of the activity.

In addition, for example, as a low-molecular-weight polymer which contains a terminal epoxy group having a weight average molecular weight (Mw) of from about 140 to about 600, VIKOLOX™ (registered trademark, manufactured by Arkema) can be used.

Various reaction reagents may be reacted with the terminal epoxy group-containing polymer represented by the general formula (9) which is obtained by the above-described method to obtain a polymer to which various substituents $Y^1$ and $Y^2$ are introduced at α and β positions of the polymer terminal, like a polymer (I) represented by the general formula (10).

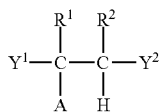 (10)

In the general formula (10), A, $R^1$ and $R^2$ represent atoms or groups which have the same definitions as those in the general formula (1). $Y^1$ and $Y^2$, which may be the same or different, each represents a hydroxyl group, an amino group, or any one of the following general formula (11a) to (11c).

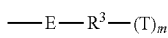 (11a)

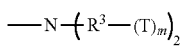 (11b)

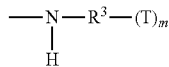 (11c)

In the general formula (11a) to (11c), E represents an oxygen atom or a sulfur atom; $R^3$ represents a hydrocarbon group having a valency of m+1; T may be the same or different and represents a hydroxyl group or an amino group, and m represents an integer of 1 to 10.

For example, a polymer in which $Y^1$ and $Y^2$ in the general formula (10) each represents a hydroxyl group is obtained by hydrolyzing a terminal epoxy group-containing polymer represented by the general formula (9), and a polymer in which one of $Y^1$ or $Y^2$ represents an amino group and the other represents a hydroxyl group is obtained by reacting ammonia.

A polymer in which one of $Y^1$ or $Y^2$ in the general formula (9) represents a group represented by the general formula (11a) and the other represents a hydroxyl group is obtained by reacting a terminal epoxy group-containing polymer represented by the general formula (9) with a reaction reagent A represented by the following general formula (12a).

$$HE-R^3-(T)_m \quad (12a)$$

E, $R^3$, T and m in the general formula (12a) represent atoms or groups which have the same definitions as those in the general formula (11a) to (11c).

In addition, a polymer in which one of $Y^1$ or $Y^2$ in the general formula (10) represents a group represented by the general formula (11b) or (11c) and the other represents a hydroxyl group is obtained by reacting a terminal epoxy group-containing polymer with a reaction reagent B represented by the following general formula (12b) or (12c).

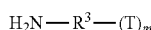 (12b)

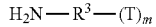 (12c)

$R^3$, T and m in the general formula (12b) and (12c) represent atoms or groups which have the same definitions as those in the general formula (11a) to (11c).

Examples of the reaction reagent A represented by the general formula (12a) include glycerin, pentaerythritol, butanetriol, dipentaerythritol, polypentaerythritol, dihydroxybenzene, and trihydroxybenzene.

Examples of the reaction reagent B represented by the general formula (12b) or (12c) include ethanolamine, diethanolamine, aminophenol, hexamethyleneimine, ethylenediamine, diaminopropane, diaminobutane, diethylenetriamine, N-(aminoethyl)propanediamine, iminobispropylamine, spermidine, spermine, triethylenetetramine, and polyethyleneimine.

Addition reactions between epoxys and alcohols or amines are well known, and may be carried out easily by conventional methods.

Polyoxyalkylene polymers represented by the general formula (1) may be produced by using a polymer (I) represented by the general formula (10) as a starting material and carrying out addition polymerization of an alkylene oxide to the hydroxyl group or the amino group.

Examples of the alkylene oxide include propylene oxide, ethylene oxide, butylene oxide, styrene oxide, cyclohexene oxide, epichlorohydrin, epibromohydrin, methyl glycidyl ether, and allyl glycidyl ether. Two or more of these may be used in combination. Among these, propylene oxide, ethylene oxide, butylene oxide, and styrene oxide may be preferable. Propylene oxide and ethylene oxide may be more preferable.

With respect to a catalyst, a polymerization condition and the like, those of known ring-opening polymerization methods of alkylene oxide may be used. For example, in Takayuki Otsu, "Kaitei Kobunshi Gosei No Kagaku (The Chemistry of Polymer Synthesis, revised edition)," Kagaku-Dojin Publishing Company, INC., January 1971, pp. 172-180, examples in which polyols are obtained by polymerization of various monomers are described. For a catalyst used for ring-opening polymerization, as disclosed in the above literature, Lewis acid such as $AlCl_3$, $SbCl_5$, $BF_3$ or $FeCl_3$ may be used for cationic polymerization; hydroxide or alkoxide of alkali metal, amines, or phosphazene catalyst may be used for anionic polymerization; and, oxide, carbonate or alkoxide of alkali earth metal, or alkoxide of Al, Zn, Fe or the like, may be used for coordination anionic polymerization. Examples of the phosphazene catalyst include compounds disclosed in JP-A No. 10-77289, and specific examples thereof include an alkoxy anion which is obtained by changing an anion of commercially available tetrakis[tris(dimethylamino)phosphoranylidenamino]phosphonium chloride by using alkoxide of alkali metal.

When a reaction solvent is used, a reaction solvent which is inert to a polymer (I) and alkylene oxide may be used, examples of the reaction solvent include aliphatic hydrocarbons such as n-hexane, alicyclic hydrocarbons such as cyclohexane, aromatic hydrocarbons such as toluene and xylene, ethers such as dioxane, and halogenated hydrocarbons such as dichlorobenzene.

An amount of the catalyst to be used other than phosphazene catalyst may be preferably in a range of from 0.05 to 5 mol, and more preferably from 0.1 to 3 mol, based on 1 mol of a polymer (I) which is a starting material. Amount of phosphazene catalyst to be used may be preferably in a range of from $1\times10^{-4}$ to $5\times10^{-1}$ mol, and more preferably $5\times10^{-4}$ to $1\times10^{-1}$ mol, based on 1 mol of a polymer (I) in view of polymerization rate, economy and the like.

A reaction temperature may be typically in a range of from 25° C. to 180° C., and preferably in a range of from 50° C. to 150° C. A reaction time may be varied depending on reaction conditions such as the amount of the catalyst to be used, the reaction temperature, or the reactivity of alkylene oxide. It may be usually in a range of from several minutes to 50 hours.

The number average molecular weight of the polyoxyalkylene polymer of a compound represented by the general formula (1) may be calculated from a number average molecular weight of the polymer (I) represented by the general formula (10), the mass of the polymer (I) to be used for polymerization and the mass of alkylene oxide to be polymerized. Therefore, by adjusting these as appropriate, the number average molecular weights of the polyoxyalkylene polymers can be controlled to the desired ranges.

<Methods for Producing Polyoxyalkylene Polymer Represented by the General Formula (13) Having a Number Average Molecular Weight of 30,000 or Less>

The polyoxyalkylene polymer represented by the general formula (13) having a number average molecular weight of 30,000 or less may be produced by, for example, using a polymer (II) represented by the following general formula (17).

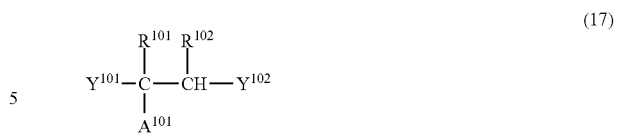

In the general formula (17), $A^{101}$, $R^{101}$ and $R^{102}$ each have the same definitions and the same preferable ranges as $A^{101}$, $R^{101}$ and $R^{102}$ in the general formula (13).

In the general formula (17), one of $Y^{101}$ or $Y^{102}$ represents a hydroxyl group and the other represents a hydrogen atom, a group represented by the following general formula (14), or a group represented by the following general formula (15).

In the general formula (14), $E^{101}$ represents an oxygen atom or a sulfur atom, and $R^{104}$ represents a hydrogen atom, a hydrocarbon group, or an acyl group.

In the general formula (15), $R^{105}$ and $R^{106}$, which may be the same or different, each represents a hydrocarbon group.

The polymer (II) represented by the general formula (17) may be produced by, for example, using a polymer which contains an epoxy group at a terminal and is represented by the following general formula (9-2).

In the general formula (9-2), $A^{101}$, $R^{101}$ and $R^{102}$ each have the same definitions and the same preferable ranges as $A^{101}$, $R^{101}$ and $R^{102}$ in the general formula (13).

A polymer in which one of $Y^{101}$ or $Y^{102}$ in the general formula (17) represents a hydrogen atom and the other represents a hydroxyl group may be obtained by, for example, subjecting a terminal epoxy group-containing polymer represented by the general formula (9-2) to hydrogenation or hydride reduction.

General methods of hydrogenation and hydride reduction of epoxy groups are known, and the synthesis may be carried out by, for example, using a method described in Journal of Organic Chemistry (1992), 57(5), 1618-1621, or a method described in Chemical Communications (Cambridge) (1999), (11), 1041-1042.

Further, a polymer in which one of $Y^{101}$ or $Y^{102}$ in the general formula (17) represents a hydroxyl group and the other represents a group represented by the general formula (14) is obtained by reacting a terminal epoxy group-containing polymer represented by the general formula (9-2) with a reaction reagent C represented by the following general formula (18).

In the general formula (18), $E^{101}$ and $R^{104}$ each have the same definitions as $E^{101}$ and $R^{104}$ in the general formula (14).

In addition, a polymer in which one of $Y^{101}$ or $Y^{102}$ in the general formula (17) represents a hydroxyl group and the other represents a group represented by the general formula (15) is obtained by reacting a terminal epoxy group-containing polymer represented by the general formula (9-2) with a reaction reagent D represented by the following the general formula (19).

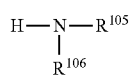
(19)

In the general formula (19), $R^{105}$ and $R^{106}$ each have the same definitions as $R^{105}$ and $R^{106}$ in the general formula (15).

Examples of the reaction reagent C represented by the general formula (18) include alcohols such as methanol, ethanol, propanol, octanol, allyl alcohol, cyclohexanol, propenyl alcohol, hexenol, bromodecanol, trifluoroethanol, hexafluoro-2-propanol, perfluorooctanol, benzyl alcohol, difluorobenzyl alcohol, pentafluorophenylmethanol, bis(4-methoxyphenyl)methanol, phenethyl alcohol, phenylpropyl alcohol, phenol, dichlorophenol, methoxyphenol, methoxycarbonylphenol, nitrophenol, hexafluorophenol, methylphenol, dimethylphenol, and naphthyl alcohol, and thioalcohols such as thiomethanol, and thioethanol. These may be used alone or in combination of two or more.

Examples of the reaction reagent D represented by the general formula (19) include methylpropylamine, ethylpropylamine, pyrrolidine, piperidine, methylcyclohexylamine, methylbenzylamine, and N-methylaniline.

Addition reactions between epoxy body and alcohols or amines are well known, and may be carried out easily by conventional methods.

A polyoxyalkylene polymer represented by the general formula (13) may be produced by using a polymer (II) represented by the general formula (17) as a starting material and carrying out addition polymerization of an alkylene oxide to a hydroxyl group or an amino group.

The catalyst, polymerization conditions, and the like are the same as the catalyst, polymerization conditions, and the like described above regarding the method for producing the polyoxyalkylene polymer represented by the general formula (1).

The number average molecular weight of the polyoxyalkylene polymer of the compound represented by the general formula (13) may be calculated from a number average molecular weight of a polymer (II) represented by the general formula (17), the mass of the polymer (II) to be used for polymerization, and the mass of alkylene oxide to be polymerized. Therefore, by adjusting these as appropriate, the number average molecular weight of the polyoxyalkylene polymers can be regulated to the desired ranges.

Although the polyoxyalkylene polymer represented by the general formula (1) or the general formula (13) may be used for a component of the antifouling agent as they are, it may be subjected to a purification operation as appropriate.

Examples of the purification operation include a method including dissolving a polyoxyalkylene polymer into a solvent to remove insoluble matters therefrom by filtration, and a method including adding auxiliaries such as active carbon or ion exchange resins and performing filtration.

A solvent to be used in this case is not limited, as long as a part or all of polyoxyalkylene polymer is dissolved into the solvent and the solvent is inert to the polyoxyalkylene polymers. Examples of the solvent include aromatic hydrocarbons such as toluene and xylene.

Antifouling Agent

The antifouling agent of the invention comprises a polyoxyalkylene polymer represented by the general formula (1) or the general formula (13) and having a number average molecular weight of 30,000 or less.

The content of the polyoxyalkylene polymer in the antifouling agent is in a range of from 1 mass ppm to 100% by mass, preferably in a range of from 100 mass ppm to 100% by mass, and more preferably in a range of from 1% by mass to 100% by mass.

The antifouling agent may further comprises the following dilution media or other additives as a component other than the polyoxyalkylene polymer.

The antifouling agent of the invention may be either solid or liquid. It may be preferable that the agent is liquid under a temperature condition at which the agent is used in view of the high flexibility for adding. When the polyoxyalkylene polymer contained in the antifouling agent of the invention is liquid, it may be used as it is as an antifouling agent without dilution (i.e., 100% by mass), or may be diluted with a dilution medium. When the polyoxyalkylene polymer is solid under a temperature condition at which the agent is used, it may be preferable that the polymer is diluted and used in a liquid form. The term "liquid" in this case includes all the states in which the polyoxyalkylene polymer is mixed with or dispersed in a dilution medium, those are specifically the states of a solution or a dispersion, and more particularly specifically the states of a solution, a suspension or an emulsion.

A dilution medium which may be contained in the antifouling agent is not limited and may be used as long as the dilution medium is inert to the polyoxyalkylene polymer. Examples of the dilution medium include an aliphatic hydrocarbon having 5 to 12 carbon atoms such as pentane, hexane, heptane, octane, decane, dodecane, methylcyclopentane and methylcyclohexane, and an aromatic hydrocarbon such as toluene and xylene. There may be a case in which a starting material, a solvent, or the like to be used for a process to which a technique for preventing fouling is applied is a preferable dilution medium.

The concentration of a polyoxyalkylene polymer in the case where the polyoxyalkylene polymer to be used is solid and is diluted with a solvent is not limited. It may be generally preferable that the concentration is in a range of from 0.1% by mass to 80% by mass.

Examples of other additives which may be contained in the antifouling agent of the invention include compounds that have been conventionally known to have an effect of preventing fouling (specific examples thereof are described below), and a wide variety of additives which can be used for a process to which a technique for preventing fouling is applied.

The antifouling agent was described hereinabove.

Examples of a preferable mode of a use of the antifouling agent include an use of the antifouling agent comprising a polyoxyalkylene polymer represented by the general formula (1) or the general formula (13) having a number average molecular weight of 30,000 or less (hereinafter also referred to as a "specific polyoxyalkylene polymer") as an antifouling agent in equipment for producing polyolefin.

Examples of a preferable mode of a use of the polyoxyalkylene polymer represented by the general formula (1) or the general formula (13) and having a number average molecular weight of 30,000 or less include an use as an antifouling agent in equipment for producing polyolefin.

Composition

The composition of the invention comprises the antifouling agent of the invention and a catalyst for olefin polymerization described below.

The addition of the composition of the invention into a component(s) in chemical equipment can lead to effects of preventing fouling and suppressing the catalytic activity reduction more effectively and make the yield of the produced polyolefin be greater.

The composition of the invention may be in an embodiment in which the antifouling agent of the invention (or the specific polyoxyalkylene polymer) and a catalyst for olefin polymerization described below are simply mixed; in an embodiment in which the antifouling agent of the invention (or the specific polyoxyalkylene polymer) is supported on the catalyst for olefin polymerization described below; or in an embodiment in which the antifouling agent of the invention (or the specific polyoxyalkylene polymer) is supported on a prepolymerized catalyst for olefin polymerization described below.

From the viewpoint of the effect of preventing fouling, the effect of suppressing catalytic activity reduction, and the yield of the produced polyolefin per unit catalyst, the content of the specific polyoxyalkylene polymer in the composition of the invention is preferably in a range of from 0.1% by mass to 50% by mass, more preferably in a range of from 0.1% by mass to 20% by mass, and particularly preferably in a range of from 0.1% by mass to 10% by mass, based on the mass of the catalyst for olefin polymerization.

Method for Preventing Fouling

The method for preventing fouling in chemical equipment of the invention comprises adding the antifouling agent of the invention into a component(s) in the chemical equipment.

Except for this, the method for preventing fouling in chemical equipment of the invention is not particularly limited. The method for preventing fouling in chemical equipment of the invention may further comprise operations other than the adding of the antifouling agent if necessary. The method for preventing fouling in chemical equipment of the invention may further comprise adding components other than the antifouling agent of the invention if necessary.

Chemical equipment of the invention refers to equipment with which a material to be handled in a chemical process (e.g., a petrochemical process, an olefin polymerization process, or the like) contacts, and examples thereof include a reactor (a polymerization reaction vessel, etc.), a heat exchanger, a distillation tower, storage tank for a starting material or a product, a pump, a dryer, a pipe therebetween, and the like.

In the invention, equipment in contact with materials to be handled in an olefin polymerization process is also referred to as equipment for producing polyolefin. The concept of the term "equipment for producing polyolefin" includes, for example, a polymerization reaction vessel for producing a polymer powder, pipes, a storage facility for storing the polymer powder, and the like.

In view of achieving an effect of the invention more effectively, a polymerization reaction vessel for producing a polymer powder may be particularly preferable as the equipment for producing polyolefin.

More specific examples of the chemical equipment are described below ([Case 1] to [Case 4]).

The amount of the antifouling agent of the invention to be added in terms of an amount of the polyoxyalkylene polymer component is typically in a range of from 0.01 mass ppm to 10,000 mass ppm, preferably in a range of from 0.05 mass ppm to 3000 mass ppm, and more preferably in a range of from 0.05 mass ppm to 1000 mass ppm, based on an amount of the components in the chemical equipment. Here, in a case of continuous process equipment, the amount of the polyoxyalkylene polymer to be added is defined relative to the processed fluid amount of components in the chemical equipment. In a case of chemical equipment such as batch reactor for batch process, the amount of the polyoxyalkylene polymer to be added is defined relative to the fluid amount at the time when components in the chemical equipment are charged into or transferred from the equipment in the same manner as for the continuous process, or relative to the total amount of components in the chemical equipment in the reactor after charging In the method for preventing fouling of the invention, the feeding of the antifouling agent of the invention may be performed at once, in an intermittent manner or in a continuous manner. In the case of a relatively small scale process or a batch process, the feeding of the antifouling agent may be performed at once. In the case of a large scale process or continuous process, the feeding of the antifouling agent may be preferably intermittent or continuous manner in view of maximizing the effect of the invention.

The term "intermittent manner" means adding a constant amount at a constant frequency such as every 3 minutes, every 10 minutes, or the like. On the other hand, the term "continuous manner" means the way to add without interruption.

In the method for preventing fouling of the invention, a compound that has been conventionally known to have an effect of antifouling (hereinafter referred to as "a conventional antifouling agent") may be added in combination with the antifouling agent of the invention within the range that the aimed effect of the invention is not impaired.

Examples of the conventional antifouling agent include a polyethyleneglycol-polypropyleneglycol block copolymer (ADEKA PLURONIC® (ADEKA CORPORATION)), alkylamides (CHEMISTAT® (Sanyo Chemical Industries, Ltd.)) and polyoxyethylene alkyl ether (EMULGEN® (Kao Corporation)). An amount of the conventional antifouling agent to be added is usually in a range of from 0.01 mass ppm to 10,000 mass ppm, preferably in a range of from 0.05 mass ppm to 3000 mass ppm, and more preferably in a range of from 0.05 mass ppm to 1000 mass ppm, based on the mass of the components in the chemical equipment. The amount of the conventional antifouling agent may be preferably smaller than the amount of the polyoxyalkylene polymer represented by the general formula (1) or the general formula (13).

In a preferable embodiment of the method for preventing fouling of the invention, the chemical equipment is equipment for producing polyolefin and a component in the chemical equipment is a component which contains at least an α-olefin. Hereinafter, this embodiment is also referred to as "(the embodiment of) the method for preventing fouling in equipment for producing polyolefin."

In the embodiment of the method for preventing fouling in equipment for producing polyolefin, fouling in equipment for producing polyolefin can be prevented while suppressing the catalytic activity reduction of a solid catalyst for olefin polymerization.

The embodiment of the method for preventing fouling in equipment for producing polyolefin can be roughly classified into the following three types of Embodiments 1 to 3.

Embodiment 1: A solid catalyst for olefin polymerization is preliminarily contained as a component in chemical equipment.

Embodiment 2: A solid catalyst for olefin polymerization is added, together with the antifouling agent of the invention, to the components in chemical equipment in which a solid catalyst for olefin polymerization may or may not be contained.

Embodiment 3: A composition comprising the antifouling agent of the invention and the solid catalyst for olefin polymerization is added to components in chemical equipment in which a solid catalyst for olefin polymerization may or may not be contained.

In the embodiment of the method for preventing fouling in the equipment for producing polyolefin, the species of the α-olefin contained in the components in the chemical equipment may be only one (embodiments in which homopolymerization of an α-olefin is performed) or two or more (embodiments in which copolymerization of α-olefins is performed). In addition, other polymerizable monomers other than α-olefin may be contained in components in the chemical equipment.

In Embodiment 2, an amount of the polyoxyalkylene polymer to be added may be preferably in a range of from 0.1% by mass to 50% by mass, more preferably in a range of from 0.1% by mass to 20% by mass, and particularly preferably in a range of from particularly preferably 0.1% by mass to 10% by mass, based on the amount of the catalyst for olefin polymerization to be added therewith, from the viewpoint of an effect of preventing fouling, an effect of suppressing the catalytic activity reduction, and the yield of the produced polyolefin per unit catalyst.

In Embodiment 3, the preferable range of the content of the polyoxyalkylene polymer in the composition is as described in the section for "Composition".

The following cases are described below in detail: that is, the case where the method for preventing fouling of the invention is applied to a petrochemical plant system which is a representative process (the case where the chemical equipment is a petrochemical plant; [Case 4]); and, the cases where the method for preventing fouling of the invention is applied to an olefin polymerization reaction system (the cases of the "embodiment of the method for preventing fouling in equipment for producing polyolefin"; [Case 1] to [Case 3]).

The following examples are roughly classified into: the cases where components in chemical equipment (Z) are substantially in gaseous state (gas phase state) ([Case 1] and [Case 2]); and the cases where components in chemical equipment (Z) are substantially in liquid state ([Case 3] and [Case 4]).

As examples of the case where the components in the chemical equipment (Z) are in gaseous phase, a case of application to olefin gas-phase polymerization [Case 1] and a case of application to olefin liquid-phase polymerization [Case 2] are described below.

As examples of the cases where the components (Z) are in liquid phase, a case of application to an intercooler [Case 3] and a case of application to a distillation and refinery tower for hydrocarbon [Case 4] are described below.

In the following description, the term "polymerization" of olefins) may be used to include "copolymerization" as well as "homopolymerization." In addition, the term "a polymer(s)" may be used to include "a copolymer(s)" as well as "a homopolymer(s)."

The entire polymerization process to be used in each case is, for example, the case where, in a method for producing polyolefin, a solid catalyst is introduced in a polymerization reaction vessel, and one or more selected from the group consisting of an α-olefin having 2 to 20 carbon atoms such as ethylene, propylene, 1-butene, 1-pentene, 1-hexene, 4-methyl-1-pentene, 1-octene, 1-decene, 1-undecene, 1-dodecene, 1-tridecene, 1-tetradecene, 1-hexadecene, 1-octadecene and 1-eicosene and a cyclic olefin having 3 to 20 carbon atoms such as cyclopentene, cycloheptene, norbornene, 5-methyl-2-norbornene and tetracyclododecene is fed to produce a polyolefin by homopolymerization or copolymerization. The polymerization may be carried out in the coexistence of other polymerizable monomers such as vinyl monomers such as styrene, vinyl chloride, vinyl acetate, vinyl acrylate, methyl methacrylate, tetrafluoroethylene, vinyl ether and acrylonitrile; conjugated dienes such as butadiene and isoprene; non-conjugated polyenes such as 1,4-hexadiene, dicyclopentadiene and 5-vinyl-2-norbornene; acetylenes such as acetylene and methylacetylene; and aldehydes such as formaldehyde, as appropriate.

Case 1: Application to Each Process of Gas-Phase Polymerization

Examples of a gas-phase continuous polymerization process to which the method for preventing fouling of the invention is applied include a process using a solid catalyst described below and using, for example, a gas-phase fluidized-bed reactor as shown in FIG. 1. FIG. 1 shows a schematic view of one example of the gas-phase fluidized-bed reactor.

In the fluidized-bed reaction vessel 3 (a polymerization reaction vessel) in the gas-phase fluidized-bed reactor shown in FIG. 1, a gas dispersion plate 4, a fluidized bed (a reaction system) 5, and a velocity reduction zone 3a are provided in this order from the upstream side (hereinafter also referred to as "bottom" side or the like) to the downstream side (hereinafter also referred to as "top" side or the like) in gas flow direction.

A circulation gas line 6 (a pipe) is connected to the upstream side end of the fluidized-bed reaction vessel 3. An outlet gas line 2 (a pipe) is connected to the downstream side end of the fluidized-bed reaction vessel 3. The outlet gas line 2 is connected to the circulation gas line 6 (a pipe) via a circulation gas blower 7 and a heat exchanger 8.

As described above, the gas-phase fluidized-bed reactor has a configuration in which gas can circulate through the circulation gas line 6, the fluidized-bed reaction vessel 3, the outlet gas line 2, the circulation gas blower 7, the heat exchanger 8, and then the circulation gas line 6, in this order.

A feed gas line 9 (a pipe) is connected to the outlet gas line 2 at a portion which is upstream of the circulation gas blower 7 so that gas (a molecular weight modifier, etc.) can be appropriately fed to the circulation system.

A catalyst feed line 1 for supplying a solid catalyst for olefin polymerization (hereinafter also referred to simply as "a solid catalyst") and a polymer outlet line 10 for discharging the produced polymer are each connected to the fluidized bed (a reaction system) 5 in the fluidized-bed reaction vessel 3.

When (co)polymerization of olefins is carried out using the gas-phase fluidized-bed reactor as shown in FIG. 1, the solid catalyst is, for example, supplied in a solid powder state through a catalyst feed line 1 to the fluidized-bed reaction vessel 3.

Gaseous olefin or the like is, for example, continuously fed from the feed gas line 9, and, by circulation gas blower 7, passed through circulation gas line 6, and then blown from the bottom of the fluidized-bed reaction vessel 3 through the gas dispersion plate 4 (a porous plate, etc.) into the fluidized bed (reaction system) 5. Thereby, the fluidized bed (reaction system) 5 is maintained in fluidized state. The olefin which is blown into such fluidized bed 5 in which the solid catalyst have been maintained in fluidized state is then polymerized in this place. As a result, a polymer powder ("polyolefin powder") is produced. The produced polyolefin powder is continuously discharged through a polymer outlet line 10 from the fluidized-bed reaction vessel 3. The unreacted gaseous olefin and the like passing through the fluidized bed 5 are decelerated in the velocity reduction zone 3a, which is provided in the downstream side of the fluidized-bed reaction vessel 3 and are discharged to the outside of the fluidized-bed reaction vessel 3 (outlet gas line 2), and the heat of polymerization is removed in the heat exchanger 8, and then, they are circulated again from the circulation gas line 6 to fluidized bed 5. A molecular weight modifier such as hydrogen may be supplied from any place of the gas-phase fluidized-bed reactor, for example, from the feed gas line 9.

When the method for preventing fouling of the invention is applied to an olefin polymerization process using such a gas-phase fluidized-bed reactor, the antifouling agent of the invention may be supplied to any place of the gas-phase fluidized-bed reactor, for example, the fluidized-bed reaction vessel, the feed gas line, the circulation gas line, the outlet gas line, and a position upstream of the heat exchanger.

In the method for preventing fouling of the invention, when the antifouling agent of the invention (or the composition of the invention) is fed to the gas-phase fluidized-bed reactor, it is preferable to pass it through the circulation gas line 6 and feed continuously or intermittently under the gas dispersion plate 4 into the fluidized-bed reaction vessel 3, or to feed continuously or intermittently from the place upper than the gas dispersion plate 4 into the fluidized-bed reaction vessel 3. In either case, intermittent feeding is more preferable.

By feeding the antifouling agent of the invention to the flow environment field in this way, sufficient effect can be attained, and the addition can be carried out very efficiently, even if the amount of the antifouling agent to be used is very small. In addition, quantitativity of the addition amount is good, and therefore, the addition can be very quantitatively carried out.

Further, the addition can be carried out at any time while monitoring the state of the flow environment field. This enables immediate determination of the influence on polymerized state caused by adding the antifouling agent such as the catalytic activity reduction. This also enables to almost eliminate or suppress the reduction of catalytic activity and/or the influence on physical properties of the obtained polyolefin powder to a minimum.

Case 2: Application to Each Process of Liquid-Phase Polymerization

Figure 2:
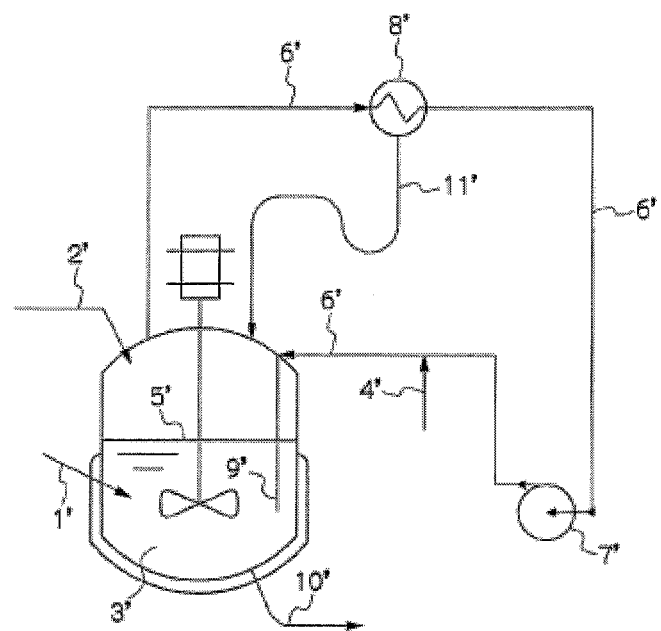
FIG. 2 is a schematic view showing one example of a liquid-phase polymerization reactor, which is an exemplary embodiment of equipment for producing polyolefin of the invention.

Examples of a liquid-phase continuous polymerization process to which the method for preventing fouling of the invention is applied include a process using a solid catalyst described below and using a liquid-phase polymerization reactor such as that shown in FIG. 2. FIG. 2 shows a schematic view of one example of the liquid-phase polymerization reactor.

In the liquid-phase polymerization reactor as shown in FIG. 2, the polymerization reaction vessel 3' has a gas phase and a liquid phase.

A feed line 2' (a pipe) for introducing gas from outside into the gas phase of the polymerization reaction vessel 3' is connected to the gas phase part of the polymerization reaction vessel 3'.

A feed line 1' (a pipe) for introducing a solid catalyst and an outlet line 10' (a pipe) for discharging the polymer produced are connected to the liquid phase part of the polymerization reaction vessel 3'.

In addition, the polymerization reaction vessel 3' is equipped with a gas blowing nozzle 9' for blowing gas from outside into the liquid phase.

Further, the polymerization reaction vessel 3' is equipped with a stirrer 5' for stirring the liquid phase.

Furthermore, one terminal end of the circulation gas line 6' (a pipe) is connected to the gas phase part of the polymerization reaction vessel 3'.

The other terminal end of the circulation gas line 6' is connected to the gas blowing nozzle 9'. Thus, gas can be flown from the gas phase of the polymerization reaction vessel 3' through the circulation gas line 6' and the gas blowing nozzle 9' toward the liquid phase of the polymerization reaction vessel 3'.

A heat exchanger 8' is equipped to the circulation gas line 6'. One terminal end of a liquefied gas circulation line 11' is connected to the heat exchanger 8'. The other terminal end of the liquefied gas circulation line 11' is connected to the polymerization reaction vessel 3'. Thus, the gas which is liquefied in the heat exchanger 8' can be introduced into the polymerization reaction vessel 3'.

In addition, the circulation gas line 6' is provided with a blower 7', and this blower 7' enables gas to flow toward to the gas blowing nozzle 9'.

The part of the circulation gas line 6' downstream of the blower 7' is equipped with a feed line 4' for feeding gas to the circulation gas line 6'.

When (co)polymerization of a olefins) is carried out using the liquid-phase polymerization reactor shown in FIG. 2, the solid catalyst is, for example, supplied in slurry or powder state through the feed line 1' to the liquid phase part of the polymerization reaction vessel 3'. Gaseous or liquid olefin and the like are fed, for example, continuously from the feed line 2'.

Next, specific embodiments of the liquid phase in the polymerization reaction vessel 3' are described.

In a bulk polymerization method in which an olefin monomers to be polymerized are condensed and the condensed olefin monomers themselves act as a solvent, the olefin monomers themselves configure the liquid phase. In polymerization methods using a paraffinic solvent, the paraffinic solvent configures the liquid phase.

In either polymerization method, the polymerization reaction of the olefin monomer proceeds in the liquid phase by feeding the solid catalyst to the liquid phase with stirring by a stirrer 5'. Solid polyolefin particles, which are polymers, exist in the liquid phase in the so-called slurry state, and are stirred by the stirrer 5'.

The produced polymer is intermittently or continuously discharged through the outlet line 10' from the polymerization reaction vessel 3'.

The unreacted gaseous olefin and the like are continuously discharged from the gas phase to the circulation gas line 6', and the heat of polymerization is removed in the heat exchanger 8', and thereafter are circulated by blower 7' from the gas blowing nozzle 9' of the polymerization reaction vessel 3' into the liquid phase. A part of the gas wherein the heat of polymerization is removed is liquefied in the heat exchanger 8'. The liquefied gas is again circulated through the liquefied gas circulation line 11' into the gas phase part or liquid phase part of the polymerization reaction vessel 3'. A molecular weight modifier such as hydrogen may be supplied from any place of the liquid-phase polymerization reactor, for example, the feed gas line 2', the feed line 4' of the circulation line 6' which is downstream of the blower 7', and/or the like. As is the case with hydrogen, organoaluminum which is a promoter or electron donor when polymerizing propylene may be fed from any place, for example, the catalyst feed line 1', the feed line 4' of the circulation line 6' which is downstream of the blower, the gas feed line 2', and the like.

When the method for preventing fouling of the invention is applied to an olefin polymerization process using such a liquid-phase polymerization reactor, the antifouling agent of the invention (or the composition of the invention) may be supplied to any place of the liquid-phase polymerization reactor, for example, the polymerization reaction vessel, the feed gas line, the circulation gas line, the outlet gas line, and the position upstream of heat exchanger.

Case 3: Application to Intercooler

Figure 3:
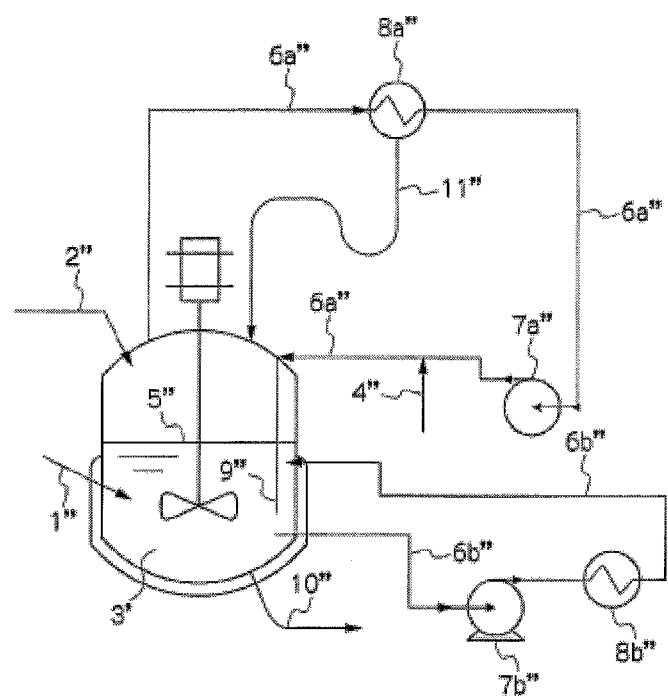
FIG. 3 is a schematic view showing one example of a liquid-phase polymerization reactor having an intercooler attached thereto, which is an exemplary embodiment of equipment for producing polyolefin of the invention.

When (co)polymerization of α olefins) is carried out using the liquid-phase polymerization reactor, and in the case where removal of the heat of polymerization by discharging the unreacted gas of the gas phase part is insufficient or difficult, or the heat of polymerization is small, a liquid-phase polymerization reactor with an intercooler such as that shown in FIG. 3 may be used.

The liquid-phase polymerization reactor with an intercooler shown in FIG. 3 is equipped with a feed line 1", a feed line 2", a polymerization reaction vessel 3", a feed line 4", a stirrer 5", a circulation gas line 6a", a blower 7a", a heat exchanger 8a", a gas blowing nozzle 9", a outlet line 10", and a liquefied gas circulation line 11". Configurations of these components are respectively the same as the feed line 1', the feed line 2', the polymerization reaction vessel 3', the feed line 4', the stirrer 5', the circulation gas line 6', the blower 7', the heat exchanger 8', the gas blowing nozzle 9', the outlet line 10', the liquefied gas circulation line 11', in the liquid-phase polymerization reactor as shown in FIG. 2, and therefore, their details are herein omitted.

The liquid-phase polymerization reactor with an intercooler shown in FIG. 3 is further equipped with a circulation line 6b" which is equipped with a circulation pump 7b" and a heat exchanger 8b" (intercooler). Both ends of the circulation line 6b" are connected to the liquid phase part of the polymerization reaction vessel 3".

Thus, a part of the liquid phase of the polymerization reaction vessel 3" is discharged, and the discharged part (the discharged slurry liquid phase) can be sent (refluxed) through the circulation pump 7b" and the heat exchanger 8b" (intercooler) into the liquid phase of the polymerization reaction vessel 3".

When the method for preventing fouling of the invention is applied to an olefin polymerization process using such a liquid-phase polymerization reactor, the antifouling agent of the invention (or the composition of the invention) may be supplied to any place, for example, the polymerization reaction vessel 3", the feed line 1", the feed line 2", the feed line 4", the position upstream of the heat exchanger 8b", and/or the like.

Case 4: Application to Distillation Tower in Petrochemical Plant

Figure 4:
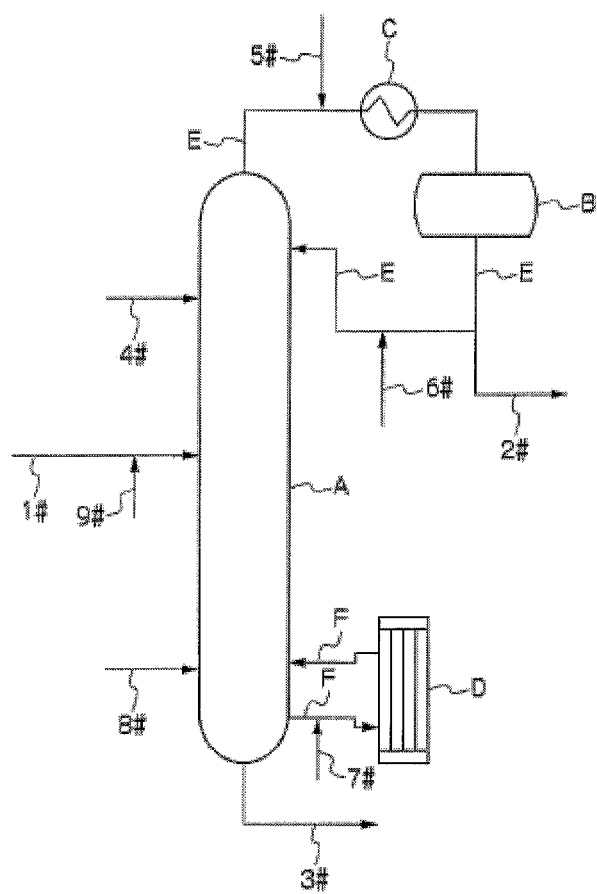
FIG. 4 is a schematic view showing one example of a method of distillation of hydrocarbon of the invention.

In petroleum plant, distillation tower as shown in FIG. 4 is almost always used for refining products.

In distillation tower to which the method for preventing fouling of the invention is applied, for example, a mixture of a paraffin(s) having 3 to 9 carbon atoms, an olefin(s), a diolefin(s) and the like is continuously fed from a feed line 1#, and separated and refined in the distillation tower A into low-boiling substances and high-boiling substances. Low-boiling compounds are distilled off from the overhead E of the distillation tower, and condensed in the heat exchanger C (condenser). The condensed substances are collected in a drum B. In order to raise the purity of refined products, a part of the collected substances is refluxed from the line E to the overhead. The low-boiling refined substances (an overhead distillate fraction) are discharged from a line 2#. On the other hand, high-boiling substances (a bottom distillate fraction) are discharged from a line 3# at the bottom. In order to raise the purity of refined products, a reboiler D is provided at the bottom through a line F.

There may be a case that starting materials are introduced from the feed lines 4#, 5#, 6#, 7#, 8# and/or 9# in order to regulate the quality of the refinement.

When the method for preventing fouling of the invention is applied to a hydrocarbon refining process in a petrochemical plant using such a distillation tower, for example, in order to prevent fouling of fillings or trays in the distillation tower body and fouling of the heat exchanger, the antifouling agent of the invention (or the composition of the invention) may be supplied to any place such as the feed lines 1#, 4#, 5#, 7#, 6#, 9#, and/or the like, and may be preferably supplied to the feed lines 1#, 4#, 6# and/or 9#.

Hereinabove, an application case of the method for preventing fouling of the invention to a petrochemical plant system (the case in which the chemical equipment of the invention is petrochemical plant (Case 4)) and application cases to an olefin polymerization reaction system (the cases in which the chemical equipment of the invention is equipment for producing polyolefin (Case 1 to Case 3)) are described.

Among these, as described above, application cases to an olefin polymerization reaction system (the cases where the chemical equipment of the invention is equipment for producing polyolefin (Case 1 to Case 3)) may be preferable.

The solid catalyst for olefin polymerization which can be used when the chemical equipment is equipment for producing polyolefin is described below in detail.

Solid Catalyst for Olefin Polymerization

There is no particular limitation to the catalyst for olefin polymerization that is used, for example, in the gas-phase or liquid-phase polymerization equipment. Specific examples thereof include carrier-supported metallocene catalysts which are supported on particulate carriers as disclosed in JP-A No. 2000-297114; cross-linked metallocene catalysts as disclosed in WO2004/029062 and JP-A No. 2004-051801; transition metal catalysts having salicylaldimine ligands as disclosed in EP0874005A; and solid titanium catalysts, chromium catalysts, and vanadium substrate catalysts as shown in JP-A Nos. S58-83006 and H7-25946. The method for preventing fouling of the invention may be applied to all of olefin polymerization systems in which the catalyst is used.

In particular, it may be preferable to use a carrier-supported metallocene catalyst for preventing fouling when gas-phase polymerization is carried out using gas-phase polymerization equipment.

The carrier-supported metallocene catalyst is composed of (A) a compound of a transition metal of Group 4 to Group 6 of the periodic table, (B) an organoaluminum oxy compound, and (C) a particulate carrier.

The carrier-supported metallocene catalyst may be prepolymerized. This prepolymerized carrier-supported metallocene catalyst (hereinafter referred to as a "prepolymerized metallocene catalyst") is composed of (A) a compound of a transition metal of Group 4 to Group 6 of the periodic table, (B) an organoaluminum oxy compound, (C) a particulate carrier, and (D) an olefin polymer produced by prepolymerization.

In the invention, the solid catalyst for olefin polymerization may be used in a form of a prepolymerized catalyst for olefin polymerization.

The prepolymerized catalyst for olefin polymerization refers to a catalyst having a configuration in which olefins are prepolymerized on a solid catalyst for olefin polymerization.

Each component composing the solid catalyst for olefin polymerization or the prepolymerized catalyst for olefin polymerization which may be preferably used for gas-phase polymerization is described below.

(A) Transition Metal Compound

Examples of the (A) compound of a transition metal of Group 4 to Group 6 of the periodic table include a compound represented by the following general formula [III].

$$ML_x \quad [III]$$

In the general formula [III], M represents one transition metal atom selected from metals of Group 4 to Group 6 of the periodic table. It may be preferably a transition metal compound of Group 4 of the periodic table, more preferably zirconium, titanium or hafnium.

x represents the valence of the transition metal and represents the number of L. L represents a ligand or group which coordinates to the transition metal.

One embodiment of such transition metal compound is a compound of a transition metal in which at least one L represents a ligand having a cyclopentadienyl skeleton, and L other than the ligand having a cyclopentadienyl skeleton represent(s) one group or atom selected from the group consisting of a hydrocarbon group having 1 to 12 carbon atoms, an alkoxy group, an aryloxy group, a trialkylsilyl group, a $SO_3R$ (in which R represents a hydrocarbon group having 1 to 8 carbon atoms which may have a substituent such as a halogen), a halogen atom, and a hydrogen atom. In this case, examples of the ligand having a cyclopentadienyl skeleton include a cyclopentadienyl group, a cyclopentadienyl group substituted by an alkyl group, an indenyl group, an indenyl group substituted by an alkyl, a 4,5,6,7-tetrahydroindenyl group, and a fluorenyl group. These groups may be substituted by a halogen atom, a trialkylsilyl group and/or the like. In addition, when a compound represented by the general formula [III] has two or more ligands having cyclopentadienyl skeleton, two of the ligands having cyclopentadienyl skeleton among of these may be bonded with each other via an alkylene group, a substituted alkylene group, a silylene group, a substituted silylene group, and/or the like. A compound having two ligands having cyclopentadienyl skeleton may be preferably used, and a compound in which M represents a zirconium and having two ligands having cyclopentadienyl skeleton may be more preferably used as the (A) transition metal compound.

When the method for preventing fouling of the invention is used for olefin polymerization reaction, a transition metal compound represented by the following general formula [IV] disclosed by the present applicant (EP0874005A), a transition metal compound described in WO2004/029062, and a cross-linked metallocene compound disclosed in JP-A No. 2004-051801 may be used as the (A) transition metal compound in addition to the above-mentioned transition metal compounds without limitation.

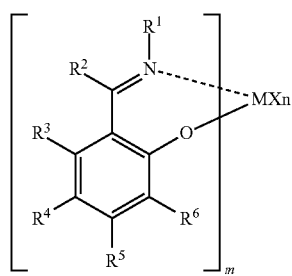

[IV]

In the general formula [IV], M represents a transition metal atom of Group 3 to Group 11 of the periodic table; m represents an integer of 1 to 6; $R^1$ to $R^6$, which may be the same or different, each represents a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group; two of more of $R^1$ to $R^6$ may be linked to form a ring(s); in the cases where m represents 2 or more, two groups of the groups represented by $R^1$ to $R^6$ may be linked; n represents a number which meets the valence of M; X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group; and in the cases where n represents 2 or more, plural groups represented by X may be the same or different, and plural groups represented by X may be linked to form a ring(s).

(B) Organoaluminum Oxy Compound

Specific examples of the (B) organoaluminum oxy compound include conventionally-known aluminoxane and benzene-insoluble organoaluminum oxy compounds illustrated in JP-A No. 2-78687.

(C) Particulate Carrier

Specific examples of the (C) particulate carrier include inorganic carriers including $SiO_2$, $Al_2O_3$, MgO, $ZrO_2$, $TiO_2$, $B_2O_3$, CaO, ZnO, BaO, $ThO_2$ and the like, and a mixture containing them, such as $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO or the like; and organic carriers including a polyethylene, a polypropylene, a poly1-butene, a poly-4-methyl-1-pentene, a styrene-divinylbenzene copolymer, and the like.

The mean particle diameter of the (C) particulate carrier is preferably in a range of from 1 μm to 300 μm, and preferably in a range of from 10 μm to 200 μm.

(E) Organoaluminum Compound

The carrier-supported metallocene catalysts and the prepolymerized metallocene catalysts used in the invention contain the (A) transition metal compound, the (B) organoaluminum oxy compound and the (C) particulate carrier as essential components, and may optionally further contain (E) an organoaluminum compound.

Examples of the (E) organoaluminum compound include an organoaluminum compound represented by the following general formula [VI].

$$R^a{}_n AlX_{3-n} \quad [VI]$$

In the general formula [VI], $R^a$ represents a hydrocarbon group having 1 to 12 carbon atoms; X represents a halogen atom or a hydrogen atom; and n represents 1 to 3.

Specific examples of such organoaluminum compounds (E) include trimethylaluminum, triethylaluminium, triisopropylaluminum, and triisobutylaluminum.

Examples of the (E) organoaluminum compound further include a compound represented by the following general formula [VII].

$$R^a{}_n AlY_{3-n} \quad [VII]$$

In the general formula [VII], $R^a$ has the same definition as $R^a$ in the general formula [VI]; Y represents —$OR^b$, —$OSiR^c{}_3$, —$OAlR^d{}_2$, —$NR^e{}_2$, —$SiR^f{}_3$ or —$N(R^g)AlR^h{}_2$—; n represents 1 to 2; $R^b$, $R^c$, $R^d$ and $R^h$ each represents a methyl group, an ethyl group, an isopropyl group, an isobutyl group, a cyclohexyl group, a phenyl group, or the like; $R^e$ represents a hydrogen atom, a methyl group, an ethyl group, an isopropyl group, a phenyl group, a trimethylsilyl group, or the like; and $R^f$ and $R^g$ each represents a methyl group, an ethyl group, or the like.

The carrier-supported metallocene catalyst is comprised of the (A) transition metal compound, the (B) organoaluminum oxy compound and the (C) particulate carrier, and may further contains (E) the organoaluminum compound if necessary. It may be prepared by mixing and contacting the (A), (B), and (C), and, if necessary, (E).

The prepolymerized metallocene catalyst is comprised of the (A) transition metal compound, the (B) organoaluminum oxy compound, the (C) particulate carrier and (D) an olefin polymer produced by prepolymerization. Examples of a method for preparing such prepolymerized metallocene catalyst include a method including prepolymerizing a small amount of olefins to a solid catalyst component, which is obtained by mixing and contacting the (A) transition metal compound, the (B) organoaluminum oxy compound and the (C) particulate carrier in an inert hydrocarbon solvent or in an olefin medium. The (E) organoaluminum compound may be used in preparation of the solid catalyst component and/or prepolymerization.

The carrier-supported metallocene catalyst and the prepolymerized metallocene catalyst may be produced by any methods including known methods, and specific examples thereof include a method according to that described in JP-A No. 2000-297114.

The olefin polymerization using the carrier-supported metallocene catalyst or the prepolymerized metallocene catalyst is carried out by gas-phase or liquid-phase polymerization. The polymerizations may further employ the (B) organoaluminum oxy compound and/or the (E) organoaluminum compound which are not supported on the (C) particulate carrier.

In carrying out gas-phase or liquid-phase polymerization, the polymerization temperature of olefin is typically in a range of from 0° C. to 200° C., and preferably in a range of from 20° C. to 180° C. The polymerization pressure may be typically in a range of from atmospheric pressure to 5 MPa, and preferably in a range of from atmospheric pressure to 4 MPa. The polymerization reaction may be carried out in any one of a batch process, a semi-continuous process or a continuous process.

Examples of the olefins which may be polymerized by the carrier-supported metallocene catalyst or the prepolymerized metallocene catalyst include an α-olefin having 2 to 20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene or 1-eicosene; and a cyclic olefin having 3 to 20 carbon atoms such as cyclopentene, cycloheptene, norbornene, 5-methyl-2-norbornene or tetracyclododecene. Styrene, vinylcyclohexane and diene may also be used.

In the olefin polymerization to which the method for preventing fouling of the invention is applied, a solid titanium catalyst may be used.

The solid titanium catalyst is comprised of (F) a solid titanium catalyst component which contains magnesium, titanium and halogen as essential components (hereinafter referred to as "titanium catalyst component") and the (E) organoaluminum compound.

(F) Titanium Catalyst Component

The (F) titanium catalyst component contains magnesium, titanium and halogen as essential components, and may further contain an electron donor if necessary.

Such (F) titanium catalyst component may be prepared by contacting a magnesium compound and a titanium compound, and, if necessary, an electron donor. When contacting the titanium compound, the magnesium compound and the electron donor, the (C) particulate carriers may be used to prepare the (F) carrier-supported titanium catalyst component. Olefins may be prepolymerized on the solid titanium catalyst. The (F) titanium catalyst component may be produced by any methods including known methods, and examples thereof include a method according to that described in JP-A Nos. S58-83006 and H7-25946.

The olefin polymerization using the solid titanium catalyst may be usually carried out by gas-phase polymerization.

In carrying out gas-phase polymerization, the olefin polymerization temperature is typically in a range of from 0° C. to 120° C., and preferably in a range of from 20° C. to 100° C. The polymerization pressure may be typically in a range of from atmospheric pressure to 10 MPa, and preferably in a range of from atmospheric pressure to 5 MPa. The polymerization reaction may be carried out in any one of a batch process, a semi-continuous process, or a continuous process.

Examples of olefin which may be polymerized by the solid titanium catalyst include the same as the olefin which may be polymerized by the metallocene catalyst.

(G) Chromium Catalyst

Next, the chromium catalyst is explained.

Examples of chromium catalyst include the following three catalysts: namely, (1) a silyl chromate catalyst, (2) a bis(cyclopentadienyl)chromium (II) compound catalyst, and (3) an oxide-form chromium.

(1) Silyl Chromate Catalyst

Examples of the silyl chromate catalyst include a silyl chromate catalyst represented by the following general formula [VIII].

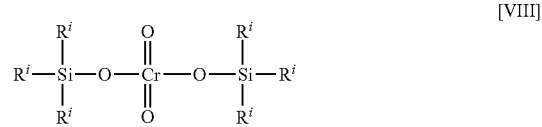

[VIII]

In the general formula [VIII], $R^i$ represents an alkyl group having 1 to 14 carbon atoms.

Preferable examples of silyl chromate catalyst include bis(triarylsilyl)chromate, and more preferable examples thereof include bis(triphenylsilyl)chromate.

The catalyst may be supported on the (C) particulate carrier and used.

The silyl chromate catalyst may be produced by known methods, and examples thereof include a method according to that described in U.S. Pat. Nos. 3,324,101 and 3,324,095.

(2) Bis(cyclopentadienyl)chromium (II) compound catalyst

Examples of bis(cyclopentadienyl)chromium (II) compound catalysts include a bis(cyclopentadienyl)chromium (II) compound catalyst represented by the following general formula [IX].

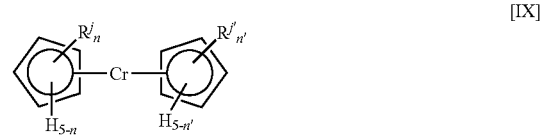

[IX]

In the general formula [IX], $R^j$ and $R^{j'}$, which is the same or different, each represents a hydrocarbon group having 1 to 20 carbon atoms; and n and n', which is the same or different, each represents an integer in a range of from 0 to 5.

The bis(cyclopentadienyl)chromium (II) compound catalyst may be supported on the (C) particulate carrier and used.

The bis(cyclopentadienyl)chromium (II) compound catalyst may be produced by known methods, and specific examples thereof include a method according to that described in Japanese Patent Publication (JP-B) No. 5-32110.

(3) Catalyst Containing Oxide-Form Chromium

Examples of the chromium compound which may be used for the "catalyst containing oxide-form chromium" include $CrO_3$, any chromium compounds which may be oxidized into $CrO_3$ under activation conditions to be used, and chromium compounds disclosed in U.S. Pat. Nos. 2,825,721 and 3,622,521.

A titanium compound may be allowed to coexist with the "catalyst containing oxide-form chromium", and examples of titanium compounds which may be used include $TiO_2$, any titanium compounds which may be oxidized into $TiO_2$ under activation conditions, and titanium compounds disclosed in U.S. Pat. No. 3,622,521.

In addition, a fluorine compound may be allowed to coexist with the catalyst containing oxide-form chromium (and optionally, titanium compounds), and examples of the fluorine compound which may be used include HF, any fluorine compounds which may produce HF under activation conditions to be used, and fluorine compounds disclosed in JP-B No. S55-34806.

The "catalyst containing oxide-form chromium" may be supported on the (C) particulate carrier and used.

The "catalyst containing oxide-form chromium" may be produced by known methods, and specific examples thereof include a method according to that described in JP-B Nos. S55-18132 and S63-22203.

In carrying out gas-phase or liquid-phase polymerization using the chromium catalyst, the olefin polymerization temperature is typically in a range of from 0° C. to 200° C., and preferably in a range of from 20° C. to 180° C. The polymerization pressure may be typically in a range of from atmospheric pressure to 5 MPa, preferably in a range of from atmospheric pressure to 4 MPa. The polymerization reaction may be carried out in any one of a batch process, a semi-continuous process, or a continuous process.

Examples of olefin which may be polymerized by the chromium catalyst include the same as the olefin which may be polymerized by the metallocene catalyst.

(H) Vanadium Substrate Catalyst

Next, the vanadium substrate catalyst is explained.

The vanadium substrate catalyst contains (I) a supported precursor substance, the (E) organoaluminum compound, and (J) an accelerator.

The (I) supported precursor substance is comprised of a vanadium compound which is impregnated in a solid inert carrier and a denaturant.

The vanadium compound in the precursor substance is a reaction product of vanadium trihalide and an electron donor, and the (C) particle carrier is used in this reaction to prepare the supported precursor substance.

The (J) accelerator is a compound represented by the following general formula [X].

$$R^k{}_b CX'_{(4-b)} \qquad [X]$$

In the general formula [X], $R^k$ represents a hydrogen or an unsubstituted or halo-substituted alkyl group having 1 to 8 carbon atoms; X' represents a halogen; and b represents 0 to 2.

The vanadium substrate catalyst may be produced by known methods using the (I) supported precursor substance, the (E) organoaluminum compound, and the (J) accelerator, and specific examples thereof include a method according to that described in JP-A No. 2-145608.

In carrying out gas-phase or liquid-phase polymerization using the vanadium catalyst, the olefin polymerization temperature is typically in a range of from 0° C. to 200° C., and preferably in a range of from 20° C. to 180° C. The polymerization pressure may be typically in a range of from atmospheric pressure to 5 MPa, and preferably in a range of from atmospheric pressure to 4 MPa. The polymerization reaction may be carried out in any one of a batch process, a semi-continuous process, or a continuous process.

Examples of olefin which may be polymerized by the vanadium catalyst include the same as the olefin which may be polymerized by the metallocene catalyst.

When the antifouling agent is added to a powder flow environment field with the above-described amount ratio in liquid-phase polymerization or gas-phase polymerization of olefins using the carrier-supported metallocene catalyst or the prepolymerized metallocene catalyst, in gas-phase polymerization of olefins using the solid titanium catalyst or in liquid-phase polymerization or gas-phase polymerization of olefins using the chromium catalyst or the vanadium substrate catalyst, the fluidity of the polymer powder can be improved, generation of polymer lumps and/or blockage of pipes and the like can be suppressed, and reduction of the catalytic activity and/or adverse effect on the physical properties of the obtained polyolefin powder can be suppressed.

According to the method for preventing fouling of the invention, fouling in the chemical equipment can be prevented and high production speed can be maintained for a long term by adding the antifouling agent of the invention into a component in chemical equipment.

Specifically, application to an olefin polymerization process can prevent fouling of polyolefin particles, solid catalysts and/or the like so that the polyolefin production efficiency can be significantly increased.

As described above, according to the antifouling agent of the invention and the method for preventing fouling in chemical equipment of the invention, the addition of the antifouling agent of the invention which comprises the specific polyoxyethylene polymer to a component in each process in a petrochemical plant or a polyolefin manufacturing plant can lead to efficiently preventing fouling in the each process, to reducing catalytic activity reduction, and to attaining a long-term stable operation, without sacrificing production speed.

Therefore, the antifouling agent of the invention and the method for preventing fouling in chemical equipment of the invention can be widely applied to various processes in a petrochemical plant or a polyolefin manufacturing plant.

EXAMPLES

The invention is described below in more concretely by way of examples. However, the invention is not limited to these examples. Physical properties shown herein were measured using the following methods.

Methods for Measuring Physical Properties

Number average molecular weight (Mn), weight average molecular weight (Mw) and molecular weight distribution (Mw/Mn)

A number average molecular weight (Mn), a weight average molecular weight (Mw) and a molecular weight distribution (Mw/Mn) were measured using gel permeation chromatography (GPC) under the following conditions. All the molecular weights by GPC herein shown are values in terms of polystyrene.

Device: GPC-150, manufactured by Millipore Corporation
    Separation column: TSK GNH HT (Column size: diameter 7.5 mm, length: 300 mm)
    Column temperature: 140° C.
    Mobile phase: ortho-dichlorobenzene (manufactured by Wako Pure Chemical Industries, Ltd.)
    Antioxidant: butylated hydroxytoluene (manufactured by Takeda Pharmaceutical Company Limited), 0.025% by mass
    Flow rate: 1.0 ml/min
    Sample concentration: 0.1% by mass
    Sample injection volume: 500 microliters
    Detector: differential refractometer Samples having molecular weights of not more than 500, which can be hardly measured by GPC, were measured using a gas chromatography-mass spectrometer (GCMS-QP5050, manufactured by SHIMADZU CORPORATION).

Melting Temperature (Tm)

A temperature on the top of a peak which was obtained by measuring with a differential scanning calorimeter (DSC, SHIMADZU CORPORATION, DSC-60) under the following conditions was employed as the melting temperature (Tm).

Cell material: aluminum
    Carrier gas: nitrogen (50 ml/min)
    Temperature program: 30° C. (10° C./min)→350° C. (constant for 5 minutes)
    $^1$H-NMR Measurement $^1$H-NMR measurement was carried out under the following conditions.

The chemical shift of the peak of deuterated 1,1,2,2-tetrachloroethane was taken as 5.92 ppm, and values of chemical shifts of other peaks were determined relative to it.

Device: JNM-GSX270 model manufactured by JEOL Ltd., or EX400 model manufactured by JEOL Ltd.
    Measurement solvent: deuterated 1,1,2,2-tetrachloroethane
    Measurement temperature: 120° C.

The double bond content (mol %), the vinyl group/vinylene group/vinylidene group content ratio (mol %), the double bond conversion (mol %), and the epoxidation rate (mol %) may be calculated by using this $^1$H-NMR measurement.

Double Bond Content (Mol %)

A polyethylene which contains a double bond at one terminal provides a peak (A), which is for three protons based on a saturated methyl group on the terminal and is observed in a range of from 0.65 ppm to 0.85 ppm, and peaks (B), which are for three protons based on a vinyl group and are observed in a range of from 4.70 ppm to 5.00 ppm and in a range of from 5.50 ppm to 5.80 ppm. Taking the peak areas of the peak (A) and the peaks (B) as $S_A$ and $S_B$ respectively, double bond content (mol %) is calculated according to the following equality.

Double bond content (mol %)=$(S_B \times 200)/(S_A+S_B)$
    Double bond conversion (mol %)

The double bond conversion is calculated from the ratio between initial double bond content and double bond content after reaction.

Vinyl group/vinylene group/vinylidene group content ratio (mol %)

A peak for 2H on a vinyl group is observed in a range of from 4.70 ppm to 5.00 ppm; a peak for 2H on a vinylene group is observed at 5.48 ppm; and a peak for 2H on a vinylidene group is observed at 4.75 ppm. The vinyl group/vinylene group/vinylidene group content ratio (mol %) may be calculated from the ratio of each integral value of these peaks.

Epoxy Group Content (Mol %)

In the case of a terminal epoxy group-containing polymer obtained by epoxidation of a polyethylene which contains a double bond at one terminal, a (C) peak for three protons on the methyl group in the saturated terminal is observed in a range of from 0.65 ppm to 0.90 ppm; and (D) peaks for each one proton of three protons residing at a portion that an epoxy group is attached are observed in a range of from 2.30 ppm to 2.40 ppm, in a range of from 2.60 ppm to 2.70 ppm, and in a range of from 2.80 ppm to 2.90 ppm, respectively. When the epoxidation was insufficient, peaks (E) for three protons on the double bond at the terminal are observed in a manner that a peak for 2 protons is observed in a range of from 4.70 ppm to 5.00 ppm and a peak for 1 proton is observed in a range of from 5.50 ppm to 5.80 ppm. Taking each peak area of peaks (C), (D) and (E) as $S_C$, $S_D$ and $S_E$, respectively, the epoxy group content (mol %) is calculated according to the following equality.

$$\text{Epoxy group content (mol \%)}=(S_D \times 200)/(S_C+S_D+S_E)$$

Epoxidation Rate (Mol %)

The epoxidation rate (mol %) is calculated from the ratio between the initial double bond content and the epoxy group content after reaction.

IR Measurement

IR measurement was carried out with JASCO FT/IR-300 using a film of a polymer. The propylene content (mol %) and the 1-hexene content (% by mass) of the polymer may be determined thereby.

Limiting Viscosity [η]

The limiting viscosity [η] of a polymer was measured using a decalin solvent at 135° C. About 20 mg of a sample was dissolved in 15 ml decalin, and the specific viscosity ηsp was measured in oil bath at 135° C. To this decalin solution, 5 ml of decalin solvent was added to dilute, and then, the specific viscosity ηsp was measured in the same manner. This dilution operation was repeated another two times, and the value of ηsp/C when extrapolating the concentration (C) to zero was calculated as a limiting viscosity (see the following equality).

$$[\eta]=\lim(\eta sp/C)(C \to 0)$$

MFR (Melt Flow Rate)

MFR was measured according to ASTM D1238-65T (190° C., Load: 2.16 kg).

Synthesis Examples of Polyoxyalkylene Polymers

Synthesis Example 1

According to Synthesis Example 6 of JP-A No. 2006-131870, an ethylene-propylene copolymer (CP-1), which contains a double bond at the terminal and having the Mw of 1355, the Mn of 687, and the Mw/Mn of 1.97 (GPC), was synthesized.

The physical properties of the obtained CP-1 were as follows.

Propylene content: 2.1 mol %
    Double bond content: 92 mol %
    Vinyl group/vinylene group/vinylidene group content ratio: 81/16/3 (measured by $^1$H-NMR)
    $^1$H-NMR: δ($C_2D_2Cl_4$) 0.85 (m), 1.0-1.5 (m), 1.95-2.10 (m), 2.50 (m), 4.65 (m), 4.90-4.96 (m), 5.38 (m), 5.70-5.91 (m)
    Melting temperature (Tm): 106° C.

According to Synthesis Example 8 of JP-A No. 2006-131870, a terminal epoxy group-containing ethylene-propylene copolymer (E-1) having the Mw of 1576, the Mn of 843, and the Mw/Mn of 1.87 (GPC) was synthesized by using the above ethylene-propylene copolymer which contains a double bond at the terminal (CP-1) as a starting material and epoxidating its double bond (double bond conversion: 100%, epoxidation rate: 99%).

The physical properties of the obtained E-1 were as follows.

$^1$H-NMR: δ($C_2D_2Cl_4$) 0.80-0.88 (m), 0.9-1.6 (m), 2.37-2.40 (1H, dd, J=2.97, 5.28 Hz), 2.50 (m), 2.66 (1H, dd, J=3.96, 5.28 Hz), 2.80-2.86 (1H, m), 2.95 (m)

Melting temperature (Tm): 107° C.

84 g of terminal epoxy group-containing ethylene-propylene copolymer (E-1) (100 mmol, with the proviso that the Mn of E-1 is 843), 39.4 g of diethanolamine (375 mmol), and 150 g of toluene were added to a 1000-mL flask and stirred at 150° C. for 4 hours.

Thereafter, acetone was added while cooling so that a reaction product was allowed to deposit. The resultant was subjected to filtration to recover solid. The obtained solid was washed once with an aqueous acetone solution and further three times with acetone while stirring, and then, the solid was recovered by filtration.

Thereafter, the obtained solid was dried under reduced pressure at room temperature to obtain a polymer (I-1), which has the Mn of 948 and is expressed by the general formula (10) in which A is a group formed by copolymerization of ethylene and propylene (Mn: 800), one of $R^1$ and $R^2$ represents a hydrogen atom and the other represents a hydrogen atom or a methyl group, one of $Y^1$ and $Y^2$ represents a hydroxyl group and the other represents a bis(2-hydroxyethyl)amino group.

The physical properties of the obtained I-1 were as follows.

$^1$H-NMR: δ($C_2D_2Cl_4$) 0.80-0.90 (m), 0.90-1.56 (m), 2.46 (dd, 1H, J=9.2, 13.5 Hz), 2.61 (dd, 1H, J=3.3, 13.5 Hz), 2.61-2.84 (m, 4H), 3.58-3.68 (m, 5H)

Melting temperature (Tm): 106° C.

20.0 g of a polymer (I-1) and 100 g toluene were added to a 500-mL flask equipped with a nitrogen-introducing tube, a thermometer, a condenser tube, and a stirring device and heated in oil bath at 125° C. while stirring to completely dissolve a solid content. After cooling the resultant to 90° C., 418 mg of 85% KOH, which was preliminarily dissolved in 5.0 g of water, was added to the flask, and the resultant was mixed under refluxing condition for 2 hours. Thereafter, water and toluene were distilled off by gradually raising the temperature inside the flask to 120° C. Then, the pressure in the flask was reduced with feeding a small amount of nitrogen into the flask. The inner temperature of the flask was raised to 150° C. and held for 4 hours. Water and toluene in the flask were then distilled off. After cooling the flask to room temperature, a solid solidified in the flask was crushed and taken out.

18.0 g of the obtained solid and 200 g of dry toluene were added to a stainless steel 1.5-L pressurized reactor equipped with a heating device, a stirring device, a thermometer, a manometer, and a safety valve. The gas phase in the reactor was replaced by nitrogen, and the temperature of the inside of the reactor was raised to 130° C. while stirring. Thirty minutes later, 36.0 g of ethylene oxide was added thereto, the resultant was held at 130° C. for 5 hours. Thereafter, the temperature of the reactor was cooled to room temperature to obtain a reactant.

The obtained reactant was dried and the solvent was removed therefrom to obtain a polyoxyalkylene polymer (a crude product). 5 g of the polyoxyalkylene polymer (a crude product) was dissolved into 400 g of toluene, and 5 g of active carbon (washed with acid (Wako Pure Chemical Industries, Ltd.)) was added thereto. After stirring at 110° C. for 2 hours, the temperature of the resultant solution was lowered to 60° C., and the resultant solution was subjected to hot filtration to remove the active carbon therefrom. The resultant solution was concentrated to obtain 4.5 g of a polyoxyalkylene polymer (P-1).

The obtained polyoxyalkylene polymer (P-1) has a number average molecular weight (Mn) of 2844, and corresponds to a polymer expressed by the general formula (1) in which A represents a group which is formed by polymerization of ethylene and propylene (Mn=800); one of $R^1$ or $R^2$ represents a hydrogen atom and the other represents a hydrogen atom or a methyl group; and, one of $X^1$ or $X^2$ represents a group represented by the general formula (2) in which E is an oxygen atom and $X^3$ is a polyethylene glycol group, and the other represents a group represented by the general formula (5) in which $Q^1$ and $Q^2$ each represents an ethylene group, and $X^9$ and $X^{10}$ each represents a polyethylene glycol group, and in which the total Mn of $X^1$ and $X^2$ is 2015. The polyoxyalkylene polymer (P-1) also corresponds to a polymer expressed by the general formula (7) in which A represents a group which is formed by polymerization of ethylene and propylene (Mn=800); one of $R^1$ or $R^2$ represents a hydrogen atom and the other represents a hydrogen atom or a methyl group; and, $X^9$, $X^{10}$, and $X^{11}$ are polyethylene glycol groups.

The physical properties of the obtained P-1 were as follows.

$^1$H-NMR: δ($C_2D_2Cl_4$) 0.88 (3H, t, J=6.6 Hz), 1.04-1.47 (m), 3.32-3.69 (m)

Melting temperature (Tm): 85.4° C., 96.1° C.

Synthesis Example 2

20.0 g of a polymer (I-1) synthesized in Synthesis Example 1 and 100 g toluene were added to a 500-mL flask equipped with a nitrogen-introducing tube, a thermometer, a condenser tube, and a stirring device and heated in oil bath at 125° C. while stirring to completely dissolve a solid content. After cooling the resultant to 90° C., 418 mg of 85% KOH, which was preliminarily dissolved in 5.0 g of water, was added to the flask, and the resultant was mixed under refluxing condition for 2 hours. Thereafter, water and toluene were distilled off by gradually raising the temperature inside the flask to 120° C. Then, the pressure in the flask was reduced with feeding a small amount of nitrogen into the flask. The inner temperature of the flask was raised to 150° C. and held for 4 hours. Water and toluene in the flask were then distilled off. After cooling the flask to room temperature, a solid solidified in the flask was crushed and taken out.

18.0 g of the obtained solid and 200 g of dry toluene were added to a stainless steel 1.5-L pressurized reactor equipped with a heating device, a stirring device, a thermometer, a manometer, and a safety valve. The gas phase in the reactor was replaced by nitrogen, and the temperature of the inside of the reactor was raised to 130° C. while stirring. Thirty minutes later, 27.0 g of ethylene oxide was added thereto, the resultant was held at 130° C. for 5 hours. Thereafter, the temperature of the reactor was cooled to room temperature to obtain a reactant.

The obtained reactant was dried and the solvent was removed therefrom to obtain a polyoxyalkylene polymer (a crude product).

The obtained polyoxyalkylene polymer was separated as particles according to WO 2009/087961. Namely, 10 g of the obtained polyoxyalkylene polymer and 40 g of pure water (produced by using a pure water producing device PURELAB OPTION-Q (ELGA)) were charged into a 100-ml autoclave, heated at 140° C. under stirring at a rate of 800 rpm for 30 minutes, and then cooled to room temperature while continuing stirring, to obtain a water dispersion (N-1). The volume 50%-average particle diameter at of the water dispersion (N-1) was 0.015 μm.

Then, a small amount of KOH contained in the water dispersion (N-1) was removed with ion exchange resins.

Namely, 1.0 g of a cation exchange resin (Dowex 50 Wx8 100-200 mesh: Dow Chemical) washed with pure water was added to 50 g of the water dispersion (N-1), and the mixture was stirred at room temperature for one hour. After removing the cation exchange resin by filtration, 0.2 g of an anion exchange resin (Amberlite IRA 400 J(C1): Rhom & Haas), which was treated with 5% aqueous NaOH solution and washed with pure water, was added to the obtained water dispersion. The resultant was stirred at room temperature for one hour. After filtering twice, the resulted water dispersion was charged to a 200-ml eggplant type flask, and was frozen with liquid nitrogen. The resultant was set into a freeze dryer (FDU-2200, manufactured by TOKYO RIKAKIKAI CO., LTD.) and dried to obtain 10 g of a polyoxyalkylene polymer (P-2) as particles in the form of powder. (The obtained P-2 corresponds to a polymer having the Mn of 2363 and is represented by the general formula (1) in which A is a group formed by polymerization of ethylene (Mn=800); one of $R^1$ or $R^2$ represents a hydrogen atom and the other represents a hydrogen atom or a methyl group; and, one of $X^1$ or $X^2$ represents a group represented by the general formula (2) in which E is an oxygen atom and $X^3$ is a polyethylene glycol group and the other represents a group represented by the general formula (5) in which $Q^1$ and $Q^2$ each represents an ethylene group and $X^9$ and $X^{10}$ each represents a polyethylene glycol group, in which total Mn of $X^1$ and $X^2$ is 1538.)

The physical properties of the obtained P-2 were as follows.

$^1$H-NMR: δ($C_2D_2Cl_4$) 0.88 (3H, t, J=6.6 Hz), 1.04-1.47 (m), 3.32-3.69 (m)

Melting temperature (Tm): 85.4° C.

Synthesis Example 3

The same operations as in the Synthesis Example 2 were repeated except that a small amount of KOH contained in the water dispersion (N-1) was neutralized with acetic acid instead of the removing operation with ion exchange resins in Synthesis Example 2. A polyoxyalkylene polymer (P-3) was thus obtained as particles in the form of powder.

Synthesis Example 4

The same operations as in the Synthesis Example 2 were repeated except that a small amount of KOH contained in the water dispersion (N-1) was neutralized with hydrochloric acid instead of the removing operation with ion exchange resins in Synthesis Example 2. A polyoxyalkylene polymer (P-4) was thus obtained as particles in the form of powder.

Synthesis Example 5

The same operations as in the Synthesis Example 2 were repeated except that a small amount of KOH contained in the water dispersion (N-1) was neutralized with nitric acid instead of the removing operation with ion exchange resins in Synthesis Example 2. A polyoxyalkylene polymer (P-5) was thus obtained as particles in the form of powder.

Synthesis Example 6

According to Synthesis Example 2 of JP-A No. 2008-274066, an ethylene polymer (CP-2), which contains a vinyl group at the terminal and having the Mw of 1380, the Mn of 627, and the Mw/Mn of 2.20, was synthesized.

The physical properties of the obtained CP-2 were as follows.

Double bond content: 96 mol %
Melting temperature (Tm): 116° C.
$^1$H-NMR: δ($C_6D_6$) 0.81 (t, 3H, J=6.9 Hz), 1.10-1.45 (m), 1.95 (m, 2H), 4.84 (dd, 1H, J=9.2, 1.6 Hz), 4.91 (dd, 1H, J=17.2, 1.6 Hz), 5.67-5.78 (m, 1H)
GPC1: Mw=1380, Mw/Mn=2.20

According to Synthesis Example A12 of WO2009/08796, a terminal epoxy group-containing ethylene polymer (E-2) was synthesized by using the above ethylene polymer which contains a vinyl group at the terminal (CP-2) as a starting material.

The physical properties of the obtained E-2 were as follows.

Epoxy group content: 95 mol %
$^1$H-NMR: δ($C_2D_2Cl_4$) 0.88 (3H, t, J=6.59 Hz), 1.04-1.50 (m), 2.38 (1H, dd, J=2.64, 5.28 Hz), 2.66 (1H, dd, J=3.96, 5.28 Hz), 2.80-2.87 (1H, m)
Melting temperature (Tm): 119° C.
Mw: 1800, Mn: 918, Mw/Mn: 1.96 (GPC)

A polymer (I-2) was obtained in the similar manner as Synthesis Example 1 except that the polymer (E-2) was used in place of the polymer (E-1). The polymer 1-2 has the Mn of 1023 and expressed by the general formula (10) in which A represents a group which is formed by polymerization of ethylene (Mn=875); $R^1$ and $R^2$ each represents hydrogen atoms; and one of $Y^1$ or $Y^2$ represents a hydroxyl group and the other represents a bis(2-hydroxyethyl)amino group.

The physical properties of the obtained I-2 were as follows.

$^1$H-NMR: δ($C_2D_2Cl_4$) 0.87 (t, 3H, J=6.6 Hz), 1.03-1.69 (m), 2.38-2.82 (m, 6H), 3.54-3.69 (m, 5H)
Melting temperature (Tm): 119° C.

A water dispersion (N-2) was obtained in the similar manner as Synthesis Example 2 via a polyoxyalkylene polymer (a crude product), except that the polymer (I-2) was used in place of the polymer (I-1) and the amount of 85% KOH to be used was changed to 386 mg. Then, the same operations as in the Synthesis Example 2 were repeated except that a small amount of KOH contained in the water dispersion (N-2) was neutralized by using acetic acid. A polyoxyalkylene polymer (P-6) was thus obtained as particles in the form of powder. The polyoxyalkylene polymer (P-6) has the Mn of 2558 and expressed by the general formula (1) in which A represents a group which is formed by polymerization of ethylene (Mn=875); $R^1$ and $R^2$ each represents a hydrogen atom; one of $X^1$ or $X^2$ represents a polyethyleneglycol and the other represents a group represented by the general formula (5) in which $Q^1$ and $Q^2$ each represents an ethylene group, and $X^9$ and $X^{10}$ each represents a polyethyleneglycol; and the total Mn of $X^1$ and $X^2$ is 1658.

The physical properties of the obtained P-6 were as follows.

$^1$H-NMR: δ($C_2D_2Cl_4$) 0.86 (3H, t, J=6.6 Hz), 0.95-1.70 (m), 3.30-4.35 (m)
Melting temperature (Tm): 110° C.

Synthesis Example 7

100 g of an ethylene polymer which contains a vinyl group at the terminal (CP-2) and 300 g of toluene were mixed and subjected to heating-refluxing with stirring for 30 minutes. After completely melting the polymer, 41.8 g of acetic acid was added thereto, and the inner temperature was changed to 90° C. Thereafter, 50.8 g of 35% aqueous hydrogen peroxide solution was added dropwise over 3 hours, and then, the resulting solution was stirred at the inner temperature of from 90° C. to 92° C. for 3 hours. After the disappearance of the peak at 991 cm$^{-1}$ was observed by IR, 100 g of warm water was added thereto. The resultant was left to stand and the aqueous layer was removed therefrom. This operation was repeated twice. Thereafter, 48.3 g of formic acid was slowly added thereto at the inner temperature of from 90° C. to 92° C. to decompose surplus peroxides, and further, esterification reaction was carried out for 10 hours. After observing the disappearance of the peak of epoxy at 847 cm$^{-1}$ by IR, 300 g of acetonitrile was slowly added thereto to crystallize a product polymer. The resultant solid was recovered by filtration, and then washed with methanol. The obtained solid was dried under reduced pressure of from 1 hPa to 2 hPa to obtain 97.0 g of a white solid of an ester-containing ethylene polymer (Yield: 97%, Conversion: 100%).

The physical properties of the obtained ester-containing ethylene polymer were as follows.

$^1$H-NMR: $\delta(C_2D_2Cl_4)$ 0.87 (t, 3H, J=6.59 Hz), 1.03-1.71 (m), 2.28-2.50 (m, 1H), 4.05 (2H, J=6.92, 11.21 Hz), 5.14 (1H, m), 8.06 (2H, m)

IR: 4322, 4250, 2924-2841, 1733, 1473, 1463, 1177, 730, 719 (cm$^{-1}$)

Melting temperature (Tm): 121° C.

97 g of the obtained ester-containing ethylene polymer and 200 g of toluene were added to a four-necked 1000-ml separable flask, and the inner temperature was changed to 105° C. Thereafter, 110 g of a solution of 5% KOH in n-BuOH was slowly added thereto, and the resultant was stirred at this temperature for 3 hours. After the disappearance of the peak at 1733 cm$^{-1}$ was observed by IR, the mixture was cooled to 60° C. While cooling, 300 g of methanol was slowly added to crystallize a product. The resultant solid was recovered by filtration, and then washed with methanol. The obtained solid was dried under reduced pressure of from 1 hPa to 2 hPa at 60° C. to obtain a polymer (I-3) having the Mn of 936 and expressed by the general formula (10) in which A is a group formed by polymerization of ethylene (Mn=875), $R^1$ and $R^2$ each represents a hydrogen atom, and $Y^1$ and $Y^2$ each represents a hydroxyl group.

The physical properties of the obtained I-3 were as follows.

$^1$H-NMR: $\delta(C_2D_2Cl_4)$ 0.88 (3H, t, J=6.92 Hz), 1.13-1.70 (m), 3.41 (2H, dd, J=6.92, 10.88 Hz), 3.57-3.63 (1H, m)

Melting temperature (Tm): 119° C.

A water dispersion (N-3) was obtained in the similar manner as Synthesis Example 2 via a polyoxyalkylene polymer (a crude product), except that the polymer (I-3) was used in place of the polymer (I-1). Then, the same operations as in the Synthesis Example 2 were repeated except that a small amount of KOH contained in the water dispersion (N-3) was neutralized by using acetic acid. A polyoxyalkylene polymer (P-7) was thus obtained as particles in the form of powder. The polyoxyalkylene polymer (P-7) has the Mn of 2335 and expressed by the general formula (1) in which A represents a group which is formed by polymerization of ethylene (Mn=875); $R^1$ and $R^2$ each represents a hydrogen atom; $X^1$ and $X^2$ each represents a group represented by the general formula (2) in which E represents an oxygen atom and $X^3$ represents a polyethyleneglycol group; and the total Mn of $X^1$ and $X^2$ is 1435.

The physical properties of the obtained P-7 were as follows.

$^1$H-NMR: $\delta(C_2D_2Cl_4)$ 0.87 (3H, t, J=6.6 Hz), 0.95-1.60 (m), 3.30-3.90 (m)

Melting temperature (Tm): 113.7° C.

Synthesis Example 8

A polyoxyalkylene polymer (P-8) was obtained as particles in the form of powder in the similar manner as Synthesis Example 7, except that the amount of ethyleneoxide was changed from 27 g to 36 g. The polyoxyalkylene polymer (P-8) has the Mn of 2747 and expressed by the general formula (1) in which A represents a group which is formed by polymerization of ethylene (Mn=875); $R^1$ and $R^2$ each represents a hydrogen atom; $X^1$ and $X^2$ each represents a group represented by the general formula (2) in which E represents an oxygen atom and $X^3$ represents a polyethyleneglycol group; and the total Mn of $X^1$ and $X^2$ is 1847.

The physical properties of the obtained P-8 were as follows.

$^1$H-NMR: $\delta(C_2D_2Cl_4)$ 0.87 (3H, t, J=6.6 Hz), 0.95-1.55 (m), 3.30-3.90 (m)

Melting temperature (Tm): 109.1° C.

Synthesis Example 9

According to Synthesis Example 1 of JP-A No. 2006-131870, an ethylene polymer (CP-3), which contains a vinyl group at the terminal and having the Mw of 1900, the Mn of 848, and the Mw/Mn of 2.20 (GPC), was synthesized.

The physical properties of the obtained CP-3 were as follows.

Double bond content: 95 mol %

$^1$H-NMR: $\delta(C_6D_6)$ 0.81 (t, 3H, J=6.9 Hz), 1.10-1.45 (m), 1.93 (m, 2H), 4.80 (dd, 1H, J=9.2, 1.6 Hz), 4.86 (dd, 1H, J=17.2, 1.6 Hz), 5.60-5.72 (m, 1H)

Melting temperature (Tm): 123° C.

According to Synthesis Example 2 of JP-A No. 2006-131870, the terminal epoxy group-containing ethylene polymer (E-3) having the Mw of 2058, the Mn of 1118, the Mw/Mn of 1.84 (GPC), and the terminal epoxy group content of 92 mol % was synthesized by using the ethylene polymer which contains an epoxy group at the terminal (CP-3).

The physical properties of the obtained E-3 were as follows.

$^1$H-NMR: $\delta(C_2D_2Cl_4)$ 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting temperature (Tm): 121° C.

84 g of the terminal epoxy group-containing ethylene polymer (E-3), 39.4 g of diethanolamine, and 150 g of toluene were added to a 1000-mL flask and stirred at 150° C. for 4 hours. Thereafter, acetone was added while cooling so that a reaction product was allowed to deposit. The resultant was subjected to filtration to recover solid. The obtained solid was washed once with an aqueous acetone solution and further three times with acetone while stirring, and then, the solid was recovered by filtration. Thereafter, the obtained solid was dried under reduced pressure at room temperature to obtain a polymer (I-4), which has the Mn of 1223 and is expressed by the general formula (10) in which A is a group formed by ethylene polymerization (Mn: 1075), $R^1$ and $R^2$ each represents a hydrogen atom, one of $Y^1$ and $Y^2$ represents a hydroxyl group and the other represents a bis(2-hydroxyethyl)amino group, with the yield of 100%.

A water dispersion (N-4) was obtained in the similar manner as Synthesis Example 2 via a polyoxyalkylene polymer (a crude product), except that the polymer (I-4) was used in place of the polymer (I-1). Then, the same operations as in the Synthesis Example 2 were repeated except that a small amount of KOH contained in the water dispersion (N-4) was neutralized by using acetic acid. A polyoxyalkylene polymer (P-9) was thus obtained as particles in the form of powder. The polyoxyalkylene polymer (P-9) has the Mn of 3045 and expressed by the general formula (1) in which A represents a group which is formed by polymerization of ethylene (Mn=1075); $R^1$ and $R^2$ each represents a hydrogen atom; one of $X^1$ or $X^2$ represents a group represented by the general formula (2) in which E represents an oxygen atom and $X^3$ represents a polyethyleneglycol group and the other represents a group represented by the general formula (5) in which $Q^1$ and $Q^2$ each represents an ethylene group and $X^9$ and $X^{10}$ each represents a polyethyleneglycol group; and the total Mn of $X^1$ and $X^2$ is 1948.

The physical properties of the obtained P-9 were as follows.

$^1$H-NMR: $\delta(C_2D_2Cl_4)$ 0.86 (3H, t, J=6.6 Hz), 0.95-1.60 (m), 3.30-4.10 (m)

Melting temperature (Tm): 117.3° C.

Synthesis Example 10

A polyoxyalkylene polymer (P-10) was obtained as particles in the form of powder in the similar manner as Synthesis Example 9, except that the amount of ethyleneoxide was changed from 27 g to 36 g. The polyoxyalkylene polymer (P-10) has the Mn of 3882 and expressed by the general formula (1) in which A represents a group which is formed by polymerization of ethylene (Mn=1075); $R^1$ and $R^2$ each represents a hydrogen atom; one of $X^1$ or $X^2$ represents a group represented by the general formula (2) in which E represents an oxygen atom and $X^3$ represents a polyethyleneglycol group and the other represents a group represented by the general formula (5) in which $Q^1$ and $Q^2$ each represents an ethylene group and $X^9$ and $X^{10}$ each represents a polyethyleneglycol group; and the total Mn of $X^1$ and $X^2$ is 2682.

The physical properties of the obtained P-10 were as follows.

$^1$H-NMR: $\delta(C_2D_2Cl_4)$ 0.87 (3H, t, J=6.6 Hz), 0.95-1.60 (m), 3.30-4.20 (m)

Melting temperature (Tm): 119.5° C.

Synthesis Example 11

A polyoxyalkylene polymer (P-11) was obtained as particles in the form of powder in the similar manner as Synthesis Example 9, except that the amount of ethyleneoxide was changed from 27 g to 72 g. The polyoxyalkylene polymer (P-11) has the Mn of 6100 and expressed by the general formula (1) in which A represents a group which is formed by polymerization of ethylene (Mn=1075); $R^1$ and $R^2$ each represents a hydrogen atom; one of $X^1$ or $X^2$ represents a group represented by the general formula (2) in which E represents an oxygen atom and $X^3$ represents a polyethyleneglycol group and the other represents a group represented by the general formula (5) in which $Q^1$ and $Q^2$ each represents an ethylene group and $X^9$ and $X^{10}$ each represents a polyethyleneglycol group; and the total Mn of $X^1$ and $X^2$ is 5000.

The physical properties of the obtained P-11 were as follows.

$^1$H-NMR: $\delta(C_2D_2Cl_4)$ 0.86 (3H, t, J=6.6 Hz), 0.95-1.60 (m), 3.30-4.20 (m)

Melting temperature (Tm): 120.5° C.

Synthesis Example 12

A polymer (I-5) was obtained in the similar manner as Synthesis Example 7 except that the terminal vinyl group-containing ethylene polymer (CP-3) was used in place of the terminal vinyl group-containing ethylene polymer (CP-2). The polymer 1-5 has the Mn of 1136 and expressed by the general formula (10) in which A represents a group which is formed by polymerization of ethylene (Mn=1075); $R^1$ and $R^2$ each represents a hydrogen atom; and $Y^1$ and $Y^2$ each represents a hydroxyl group).

The physical properties of the obtained I-5 were as follows.

$^1$H-NMR: $\delta(C_2D_2Cl_4)$ 0.88 (3H, t, J=6.92 Hz), 1.13-1.70 (m), 3.41 (2H, dd, J=6.92, 10.88 Hz), 3.57-3.63 (1H, m)

Melting temperature (Tm): 119° C.

A polyoxyalkylene polymer (P-12) was obtained as particles in the form of powder in the similar manner as Synthesis Example 7, except that the polymer (I-5) was used in place of the polymer (I-3). The polyoxyalkylene polymer (P-12) has the Mn of 2750 and expressed by the general formula (1) in which A represents a group which is formed by polymerization of ethylene (Mn=1075); $R^1$ and $R^2$ each represents a hydrogen atom; $X^1$ and $X^2$ each represents a group represented by the general formula (2) in which E represents an oxygen atom and $X^3$ represents a polyethyleneglycol group; and the total Mn of $X^1$ and $X^2$ is 1650.

The physical properties of the obtained P-12 were as follows.

$^1$H-NMR: $\delta(C_2D_2Cl_4)$ 0.89 (3H, t, J=6.92 Hz), 1.05-1.84 (m), 3.41 (1H, dd, J=5.94, 9.89 Hz), 3.57-3.63 (1H, m)

IR: 4322, 4250, 3370, 2950-2345, 2635, 1581, 1462-1377, 1122, 730-718, 619 (cm$^{-1}$)

Melting temperature (Tm): 122° C.

Synthesis Example 13

The same operations as in the Synthesis Example 9 were repeated except that a small amount of KOH contained in the water dispersion (N-4) was removed with ion exchange resins instead of the neutralization with acetic acid. A polyoxyalkylene polymer (P-13) was thus obtained as particles in the form of powder.

Example 1

In Example 1, the effect of antifouling agent was evaluated as follows.

Figure 5:
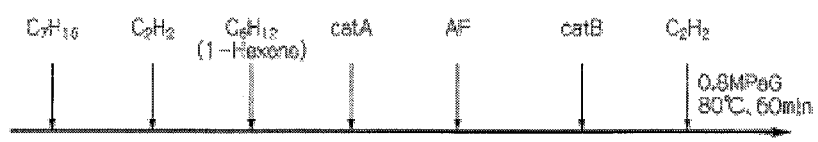
FIG. 5 is an explanatory diagram showing overview of one example of a polymerization method of the invention.

As shown in FIG. 5, heptane ($C_7H_{16}$), ethylene ($C_2H_2$), 1-hexene ($C_6H_{12}$ (1-Hexene)), a catalyst A (catA), an antifouling agent (AF), a catalyst B (catB), and ethylene ($C_2H_2$) was introduced into a polymerization vessel (a autoclave, etc.) in this order, provided that the order of the antifouling agent and the catalyst B may be simultaneous. Then, polymerization was carried out for 1 hour under polymerization conditions at a pressure of 0.8 MPaG and at a temperature of 80° C. Prepolymerized catalysts (b1) described below were used as a catalyst A and a catalyst B.

After the polymerization, the effect of preventing fouling was evaluated by visually observing whether depositions on the wall, the screw, and/or the like inside the polymerization vessel occurred or not.

A value obtained by dividing the mass (unit: gram) of an ethylene/1-hexene copolymer obtained by the polymerization by the mass (unit: gram) of a solid catalyst (a1) contained in the catalyst A and the catalyst B was calculated, and the value was regarded as the catalytic activity.

Next, a control experiment was carried out in the same manner as in the polymerization except that the antifouling agent was not used (Comparative Example 1 described below) to calculate the catalytic activity.

Next, a specific activity (%) was calculated according to the following equality to evaluate the effect of the antifouling agent on the catalytic activity.

Specific activity (%)={(catalytic activity in the case where a antifouling agent was used)/(catalytic activity in the case where an antifouling agent was not used)}×100

In an usual polymerization, an alkyl aluminum (such as triisobutylaluminum) is used as a scavenger at the time of using the catalyst A in FIG. 5.

However, in the usual polymerization, there may be a case in which the effect of the antifouling agent is hardly confirmed because alkyl aluminums itself exhibits a certain level of function to prevent adhering of the polymer powder onto the wall of the polymerization vessel.

Thus, in order to more easily confirm the effect of the antifouling agent, Example 1 employs a catalyst A (prepolymerized catalyst (b1)) as a scavenger instead of alkyl aluminums used in the usual polymerization In Example 1, when the catalyst A (prepolymerized catalyst (b1)) in FIG. 5 is not used, the yield of the polymers becomes extremely low. This is because a part of active sites on the catalyst B (prepolymerized catalyst (b1)) is inactivated by impurities in the system.

On the other hands, in Example 1, when the catalyst B in FIG. 5 is not used, polymers are hardly obtained. This is because almost all aluminum contained in the catalyst A (derived from aluminoxane or the like) functions as a scavenger and almost all the active sites of the catalyst A is inactivated.

Preparation of Solid Catalyst Component (a1)

10 kg of silica which was dried at 250° C. for 10 hours was suspended in 154 liters of toluene and cooled to 0° C. Thereafter, 50.5 liters of a solution of methylaluminoxane in toluene (Al=1.52 mol/liter) was added dropwise to this suspension for 1 hour. During this, the temperature in the system was maintained within the range from 0° C. to 5° C. The mixture was subsequently allowed to react at 0° C. for 30 minutes, and then, the temperature was raised to 95° C. for 1.5 hours, followed by allowing the mixture to react at this temperature for 4 hours. Thereafter, the temperature was lowered to 60° C., and the supernatant was removed by decantation. The thus obtained solid component was washed twice with toluene, and then resuspended with 100 liters of toluene to attain a total volume of 160 liters, thereby obtaining a suspension of a solid component (S) in toluene.

To the thus obtained suspension, 22.0 liters of a solution of bis(1-n-butyl-3-methylcyclopentadienyl)zirconium dichloride in toluene (Zr: 25.7 mmol/liter) was added dropwise at 80° C. for 30 minutes, and the resultant was allowed to react at 80° C. for another 2 hours. Thereafter, the supernatant was removed, and the residue was washed twice with hexane to obtain a solid catalyst component (a1) which contains 3.2 mg of zirconium per 1 g of the solid catalyst component.

Preparation of Prepolymerized Catalyst (b1)

7.0 kg of the prepared solid catalyst component (a1) and hexane were charged into a 350-L reaction vessel in which the atmosphere was sufficiently replaced with nitrogen to attain a total volume of 285 liters. The temperature in the system was cooled to 10° C., and then, ethylene was blown into the hexane at a flow rate of 8 Nm³/hr for 5 minutes. During this, the temperature in the system was maintained within the range from 10° C. to 15° C. Then, the supply of ethylene was stopped and 2.4 mol of triisobutylaluminum and 1.2 kg of 1-hexene was charged. After the system was changed to a closed system, supply of ethylene at a flow rate of 8 Nm³/hr was again started. Fifteen minutes later, the flow rate of ethylene was reduced to 2 Nm³/hr and the pressure in the system was set to 0.08 MPaG. During this, the temperature in the system was increased to 35° C. Thereafter, while adjusting the temperature in the system to 32-35° C., ethylene was supplied at a flow rate of 4 Nm³/hr for 3.5 hours. During this, the pressure in the system remained at 0.07 MPaG to 0.08 MPaG. Then, the atmosphere in the system was replaced with nitrogen. Thereafter, the supernatant was removed and the residue was washed twice with hexane to obtain a prepolymerized catalyst (b1) in which 3 g of a polymer was prepolymerized per 1 g of the solid catalyst component (a1). The limiting viscosity [η] of the prepolymerized polymer was 2.1 dl/g, and the content of 1-hexene was 4.8% by mass.

Preparation of Antifouling Agent

The polyoxyethylene polymer P-1 which was prepared in Synthesis Example 1 was dissolved into toluene to prepare a solution of P-1 in toluene having a P-1 concentration of 3.0 mg/ml. This solution was used as an antifouling agent (Q-1) for the polymerization described below.

Polymerization 1000 ml of heptane was charged into a stainless steel autoclave having an inner volume of 2 liters in which the atmosphere was sufficiently replaced with nitrogen, and the atmosphere in the system was replaced with ethylene. Thereafter, 40 ml of 1-hexene and 0.6 g of the prepared prepolymerized catalyst (b1) was charged, and the resultant was held at room temperature for 10 minutes. The temperature in the system was raised to 55° C. Thereafter, 3.3 ml of the prepared antifouling agent (Q-1) (10 mg as a polyoxyethylene polymer P-1) and 0.6 g of the prepared prepolymerized catalyst (b1) was charged thereto, and then ethylene was introduced to start polymerization. Thereafter, while continuously supplying ethylene, polymerization was carried out under polymerization conditions of 0.8 MPaG and 80° C. for 1 hour. Filtration was performed to collect a polymer, and the polymer was dried under reduced pressure at 80° C. overnight. 262 g of an ethylene/1-hexene copolymer having the melt flow rate of 0.12 g/10 min, the density of 927 kg/m³, and the bulk specific gravity of 410 kg/m³ was thus obtained.

The activity, which is the value obtained by dividing the mass (unit: gram) of the obtained ethylene/1-hexene copolymer by the mass (unit: gram) of the solid catalyst (a1), was 2090, and the specific activity, which is the value when the activity without the antifouling agent (below-described Comparative Example 1) is taken as 100, was 94.

The condition inside the polymerization vessel after reaction looked good, as there was no adhesion of polymer (fouling) on the wall, the screw and the like.

Examples 2 and 3

The same polymerization as in Example 1 was carried out except that the amount of the antifouling agent (Q-1) to be added in the polymerization operation of Example 1 was changed to 1.67 ml (5 mg in terms of the polyoxyethylene polymer P-1) (Example 2) or 0.42 ml (1.25 mg in terms of the polyoxyethylene polymer P-1) (Example 3).

The activity, the specific activity, and the condition inside the polymerization vessel after reaction are summarized in Table 1.

Comparative Examples 1 to 3

The same polymerization as in Example 1 was carried out except that, instead of the antifouling agent (Q-1) which was used in the polymerization operation of Example 1, the antifouling agent was not used (Comparative Example 1); or CHEMISTAT-2500® (Sanyo Chemical Industries, Ltd.) was used as an antifouling agent in an amount of 10 mg (Comparative Example 2) or 5 mg (Comparative Example 3).

The activity, the specific activity, and the condition inside the polymerization vessel after reaction are summarized in Table 1.

TABLE 1

| | Antifouling agent (AF agent) | Added amount of AF agent | Activity PE(g)/solid catalyst a1 | Specific activity (%) | Condition after polymerization |
|---|---|---|---|---|---|
| Example 1 | Q-1 | 3.3 ml (10 mg as P-1) | 2090 | 94 | Good. No adhesion. |
| Example 2 | Q-1 | 1.67 ml (5 mg as P-1) | 2040 | 92 | Good. No adhesion. |
| Example 3 | Q-1 | 0.42 ml (1.25 mg as P-1) | 2440 | 110 | Good. No adhesion. |
| Comparative Example 1 | None | — | 2220 | 100 | Large amount of electrostatic adhesion. |
| Comparative Example 2 | CHEMISTAT-2500 | 10 mg | 1870 | 84 | Good. No adhesion. |
| Comparative Example 3 | CHEMISTAT-2500 | 5 mg | 1850 | 83 | Good. No adhesion. |

As is clear from Table 1, when an antifouling agent is not used, a significant amount of adhesion of polymer particles onto the reaction vessel (fouling) occurs (Comparative Example 1); when CHEMISTAT-2500, which is a conventional antifouling agent, is used (Comparative Examples 2 to 3), an effect of preventing fouling can be sufficiently exhibited, but a catalytic activity (a specific activity when taking the activity of Comparative Example 1 as 100) is decreased. In contrast, when the antifouling agent of the invention is used (Examples 1 to 3), the effect of preventing fouling is sufficiently exhibited, and in addition, the catalytic activity is retained higher compared with the conventional antifouling agent.

From these, it is clear that the antifouling agent and the method for preventing fouling of the invention have excellent effect of striking a balance between preventing fouling and retaining the activity, which had not been able to heretofore.

Example 4

In Examples 4 to 17 and Comparative Examples 4 to 7, evaluations of the polymerization with respect to the antifouling agent were carried out in view of two items of: polymerization evaluation (1) (activity evaluation); and polymerization evaluation (2) (electrostatic fouling evaluation).

In the polymerization evaluation (1) (activity evaluation), in accordance with usual polymerization, triisobutylaluminum was used as a scavenger at the point which is shown as a point for adding the catalyst A in FIG. 5 (after addition of 1-hexene but before addition of antifouling agent) instead of the prepolymerized catalyst (b1).

In the polymerization evaluation (2) (electrostatic fouling effect), the same evaluation as in Example 1 was carried out.

Preparation of Antifouling Agent

In a nitrogen box, a polyoxyethylene polymer P-3 which was prepared in Synthesis Example 3 was dispersed into heptane to prepare a slurry solution of P-3 in heptane having a P-3 concentration of 1.75 mg/ml. This solution was used as an antifouling agent (Q-2) in the polymerization described below.

Polymerization Evaluation (1): Activity Evaluation 500 ml of heptane was charged into a stainless steel autoclave having an inner volume of 1 liter in which the atmosphere was sufficiently replaced with nitrogen, and the atmosphere in the system was replaced with ethylene. Thereafter, 20 ml of 1-hexene and 0.06 mmol of triisobutylaluminum were added thereto, and the resultant was held at room temperature for 5 minutes. Thereafter, 4.0 ml of the antifouling agent (Q-2) (7 mg as an polyoxyethylene polymer P-3) and 0.4 g of the prepolymerized catalyst (b1) which was prepared in Example 1 was charged. While continuously supplying ethylene, polymerization was carried out under polymerization conditions of 0.8 MPaG and 80° C. for 90 minutes. Filtration was performed to collect a polymer, and the polymer was dried under reduced pressure at 80° C. overnight to obtain an ethylene/1-hexene copolymer. The same process for the evaluation of the polymerization was repeated 5 times. As a result, the average activity (a value obtained by dividing the mass (unit: gram) of the obtained ethylene/1-hexene copolymer by the mass (unit: gram) of the solid catalyst (a1)) was 1722 gram/gram-catalyst, and the specific activity, when the activity without an antifouling agent was taken as 100, was 98.

Polymerization Evaluation (2): Electrostatic Fouling Evaluation

Polymerization evaluation (2) was carried out in the same manner as in the polymerization evaluation (1) except that: 0.4 g of a prepolymerized catalyst (b1) was used instead of triisobutylaluminum in the polymerization evaluation (1); the temperature was raised to 55° C., and thereafter the antifouling agent (Q-2) and a prepolymerized catalyst were added; and the polymerizing time was changed from 90 minutes to 60 minutes.

Adhesion of polymer onto the wall or the like after polymerization was not observed.

The activity, the specific activity, and the polymerized state inside the polymerization vessel after reaction are summarized in Table 2.

Examples 5 and 6

Antifouling agents Q-3 or Q-4 were obtained by using P-4 or P-5 respectively instead of the polyoxyethylene polymer P-3 in preparation of the antifouling agent of Example 4. The same polymerization as in Example 4 was carried out except that the antifouling agent Q-3 and Q-4 were respectively used instead of the antifouling agent Q-2 in the polymerization evaluations (1) and (2).

The activity, the specific activity, and the polymerized state inside the polymerization vessel after reaction are summarized in Table 2.

Example 7

The same polymerization as in Example 4 was carried out except that: the amount of the antifouling agent (Q-2) to be added in the polymerization evaluations (1) and (2) of Example 4 was changed to 8.0 ml (14 mg as a polyoxyethylene polymer P-3); and the number of polymerization in the polymerization evaluation (1) was changed to once.

The activity, the specific activity, and the polymerized state inside the polymerization vessel after reaction are summarized in Table 2.

Examples 8 to 15

Antifouling agents Q-5, Q-6, Q-7, Q-8, Q-9, Q-10, Q-11, and Q-12 were obtained by using P-6, P-7, P-8, P-9, P-10, P-11, P-12, and P-13 respectively instead of the polyoxyethylene polymer P-3 in preparation of the antifouling agent of Example 4. The same polymerization as in Example 4 was carried out except that the antifouling agent Q-5 to Q-12 were respectively used instead of the antifouling agent Q-2 in the polymerization evaluations (1) and (2).

The activity, the specific activity, and the polymerized state inside the polymerization vessel after reaction are summarized in Table 2.

Example 16

The same polymerization as in Example 9 was carried out except that the amount of the antifouling agent (Q-6) to be added in the polymerization evaluations (1) and (2) of Example 9 was changed to 8.0 ml (14 mg as a polyoxyethylene polymer P-7).

The activity, the specific activity, and the polymerized state inside the polymerization vessel after reaction are summarized in Table 2.

Comparative Examples 4 and 5

The same polymerization as in Example 4 was carried out except that, instead of the antifouling agent (Q-2) which was used in polymerization evaluations (1) and (2) of Example 4, the antifouling agent was not used (Comparative Example 4); or CHEMISTAT-2500® (Sanyo Chemical Industries, Ltd.) was used as an antifouling agent in an amount of 7 mg (Comparative Example 5).

The activity, the specific activity, and the polymerized state inside the polymerization vessel after reaction are summarized in Table 2.

TABLE 2

| | Antifouling agent (AF agent) | Added amount of AF agent | Activity PE(g)/solid catalyst a1 | Specific activity (%) | Polymerized state |
|---|---|---|---|---|---|
| Example 4 | Q-2 | 4.0 ml (7 mg as P-3) | 1722 | 98 | Good. No adhesion. |
| Example 5 | Q-3 | 4.0 ml (7 mg as P-4) | 1735 | 99 | Good. No adhesion. |
| Example 6 | Q-4 | 4.0 ml (7 mg as P-5) | 1766 | 101 | Good. No adhesion. |
| Example 7 | Q-2 | 8.0 ml (14 mg as P-3) | 1781 | 101 | Good. No adhesion. |
| Example 8 | Q-5 | 4.0 ml (7 mg as P-6) | 1699 | 97 | Good. No adhesion. |
| Example 9 | Q-6 | 4.0 ml (7 mg as P-7) | 1754 | 100 | Good. No adhesion. |
| Example 10 | Q-7 | 4.0 ml (7 mg as P-8) | 1700 | 97 | Good. No adhesion. |
| Example 11 | Q-8 | 4.0 ml (7 mg as P-9) | 1675 | 96 | Good. No adhesion. |
| Example 12 | Q-9 | 4.0 ml (7 mg as P-10) | 1805 | 103 | Good. No adhesion. |
| Example 13 | Q-10 | 4.0 ml (7 mg as P-11) | 1792 | 102 | Good. No adhesion. |
| Example 14 | Q-11 | 4.0 ml (7 mg as P-12) | 1706 | 97 | Good. No adhesion. |
| Example 15 | Q-12 | 4.0 ml (7 mg as P-13) | 1773 | 101 | Good. No adhesion. |
| Example 16 | Q-6 | 8.0 ml (14 mg as P-7) | 1750 | 100 | Good. No adhesion. |
| Comparative Example 4 | None | — | 1753 | 100 | Large amount of electrostatic adhesion. |
| Comparative Example 5 | CHEMISTAT-2500 | 7 mg | 1401 | 80 | Good. No adhesion. |

As is apparent from Table 2, when an antifouling agent is not used, a significant amount of adhesion of polymer particles onto the reaction vessel (fouling) occurred (Comparative Example 4); when CHEMISTAT-2500, which is a conventional antifouling agent, is used (Comparative Example 5), an effect of preventing fouling can be sufficiently exhibited, but a catalytic activity (a specific activity when taking the activity of Comparative Example 4 as 100) is decreased. In contrast, when the antifouling agent of the invention is used (Examples 4 to 16), the effect of preventing fouling is sufficiently exhibited, and in addition, the catalytic activity is retained higher compared with the conventional antifouling agent.

From these, it is clear that the antifouling agent and method for preventing fouling of the invention have excellent effect of striking a balance between preventing fouling and retaining the activity, which had not been able to heretofore.

Example 17

Preparation of solid catalyst component (X-1)

50 mL of toluene was added to a 200-mL glass flask in which the atmosphere was replaced with nitrogen, and the suspension of the solid component (S) in toluene, which was prepared in Example 1, was further charged (1.0 g in terms of the solid part) into the flask. Then, 7.6 mL of a solution of dimethylsilylene(3-n-propylcyclopentadienyl)(cyclopentadienyl)zirconium dichloride (synthesized according to Synthesis Example 2 of WO2009/066689) in toluene (0.002 mmol/mL in terms of Zr atoms) and 5.1 mL of a solution of dimethylmethylene (cyclopentadienyl)(2,7-di-t-butylfluorenyl)zirconium dichloride (synthesized according to Example 1 of JP-A No. 4-69394) in toluene (0.002 mmol/mL in terms of Zr atoms) was mixed and added dropwise, and the resultant was allowed to react at room temperature for 1 hour. Incidentally, Zr was not detected from the supernatant toluene after reaction for 1 hour. Then, the supernatant was removed by decantation, and the residue was washed twice with heptane to obtain 50 ml of a heptane slurry (a solid catalyst component X-1).

Preparation of solid polymerization catalyst (XP-1)

Then, the thus obtained slurry of the solid catalyst component (X-1) in heptane was cooled to 10° C., and thereafter, 2.0 mmol of diisobutylaluminium hydride and 0.13 mL of 1-hexene were added thereto under nitrogen flow. After adding the 1-hexene, ethylene circulation was started, and polymerization (prepolymerization) was carried out at a temperature in the system of 35° C. by 3-fold amount of ethylene relative to the solid catalyst component X-1 in terms of the mass to obtain a pre-catalyst component. Thereafter, the supernatant was removed by decantation, and the pre-catalyst component was washed 3 times with heptane to obtain 50 ml of a heptane slurry.

Thereafter, 40 mg of the polyoxyalkylene polymer (P-2), which was synthesized in Synthesis Example 2, was added into the slurry, and the temperature in the system was incubated at a temperature of from 34° C. to 36° C. for 1 hour to allow the polymer to react to the prepolymerized catalyst component. The solvent was removed using a glass filter, and the residue was dried under reduced pressure at 25° C. to obtain 4.0 g of a solid polymerization catalyst (XP-1) in which 3 g of polymers (polyethylene and the polyoxyalkylene polymer (P-2)) were polymerized per 1 g of the solid catalyst component.

The composition of the obtained solid polymerization catalyst (XP-1) was examined. As a result, Zr atoms were contained in an amount of 0.50 mg per 1 g of the solid polymerization catalyst (XP-1).

Polymerization Evaluation (1): Activity Evaluation 500 mL of purified heptane was added to a SUS autoclave having an inner volume of 1 liter in which the atmosphere was sufficiently replaced with nitrogen, and ethylene was circulated therein to saturate the liquid and gas phases with ethylene. Then, 10 mL of 1-hexene and 0.375 mmol of triisobutylaluminum were added, and 0.16 g of the solid polymerization catalyst (XP-1) was further charged. The temperature was then raised to 80° C. and polymerization was carried out at 0.78 MPa·G for 90 minutes. A polymer obtained thereby was dried under vacuum for 10 hours. As a result, the catalytic activity, which is a value obtained by dividing the mass (unit: gram) of the obtained ethylene/1-hexene copolymer by the mass (unit: gram) of the solid catalyst (XP-1), was 720 g/g-catalyst, and the specific activity, which is a value when the activity without an antifouling agent is taken as 100, was 96.

Polymerization Evaluation (2): Electrostatic Fouling Evaluation

Polymerization Evaluation (2) was carried out in the same manner as in the polymerization evaluation (1) except that: triisobutylaluminum in the polymerization evaluation (1) of Example 4 was not used; the amount of 1-hexene to be added was changed to 5 ml; and, the amount of the solid polymerization catalyst (XP-1) to be added was changed to 0.54 g.

After completion of polymerization, no adhesion of polymer onto the polymerization vessel wall was observed.

Comparative Example 6

Preparation of Solid Polymerization Catalyst (XP-2)

The preparation of a solid polymerization catalyst (XP-2) was carried out in the same manner as the preparation of the solid catalyst component (XP-1) of Example 17 except that the polyoxyalkylene polymer (P-2) in the preparation of the solid polymerization catalyst (XP-1) of Example 17 was not added. As a result, 4.0 g of the solid polymerization catalyst (XP-2) was prepared.

Polymerization Evaluation

The same evaluation as in the polymerization evaluation (1) of Example 17 was carried out except that 0.08 g of the solid polymerization catalyst (XP-2) was used instead of the solid polymerization catalyst (XP-1) in the polymerization evaluation (1) of Example 17.

The obtained polymer was dried under vacuum for 10 hours. As a result, the catalytic activity (a value obtained by dividing the mass (unit: gram) of the obtained ethylene/1-hexene copolymer by the mass (unit: gram) of the solid catalyst (XP-2)) was 750 gram/gram-catalyst.

The same evaluation as in the polymerization evaluation (2) of Example 17 was carried out except that 0.58 mg of the solid polymerization catalyst (XP-2) was used instead of the solid polymerization catalyst (XP-1) in the polymerization evaluation (2) of Example 17.

After completion of polymerization, a significant amount of adhesion of polymer onto the polymerization vessel wall was observed.

Comparative Example 7

Preparation of Solid Polymerization Catalyst (XP-3)

The preparation of a solid polymerization catalyst (XP-3) was carried out in the same manner as the preparation of the solid catalyst component (XP-1) of Example 17 except that, instead of the polyoxyalkylene polymer (P-2), 40 mg of CHEMISTAT-2500® (Sanyo Chemical Industries, Ltd.) was used. As a result, 4.0 g of the solid polymerization catalyst (XP-3) was prepared.

The same evaluation as in the polymerization evaluation (1) of Example 17 was carried out except that 0.14 g of the solid polymerization catalyst (XP-3) was used instead of the solid polymerization catalyst (XP-1) in the polymerization evaluation (1) of Example 17.

The obtained polymer was dried under vacuum for 10 hours. As a result, the catalytic activity (a value obtained by dividing the mass (unit: gram) of the obtained ethylene/1- hexene copolymer by the mass (unit: gram) of the solid catalyst (XP-3)) was 500 gram/gram-catalyst. The specific activity, which is a value when the activity without an antifouling agent is taken as 100, was 67.

The same evaluation as in the polymerization evaluation (2) of Example 17 was carried out except that 0.60 mg of the solid polymerization catalyst (XP-3) was used instead of the solid polymerization catalyst (XP-1) in the polymerization evaluation (2) of Example 17.

After completion of polymerization, no adhesion of polymer onto the polymerization vessel wall was observed.

From these results, it is understood that a catalyst containing the polyoxyalkylene polymer has an effect of remediation of fouling with little loss of the polymerization activity.

Example 18

Preparation of Antifouling Agent

In a nitrogen box, the polyoxyethylene polymer P-2 which was prepared in Synthesis Example 2 was dispersed into hexane to prepare a slurry solution in hexane having a P-2 concentration of 10 mg/ml. This solution was used as an antifouling agent (Q-13) in the polymerization described below.

Polymerization Evaluation 100 g of the ethylene/1-hexene copolymer powder, which was obtained in Comparative Example 1, was added to a SUS autoclave having an inner volume of 1 liter in which the atmosphere had been sufficiently replaced with nitrogen. The inside of the autoclave was dried under vacuum at 80° C. for 2 hours, and then, the gas phase part was replaced with ethylene/1-butene mixture gas having a concentration of 1-butene relative to ethylene of 4 vol %. Then, 12 ml of the prepared antifouling agent (Q-13) (0.12 g as a polyoxyalkylene polymer P-2) and 1.4 g of the solid polymerization catalyst (XP-3), which was obtained in Comparative Example 7, were added, and then, the pressure was changed to 0.78 MPa·G using ethylene/1-butene mixture gas, and polymerization was carried out at 80° C. for 90 minutes.

After completion of polymerization, adhesion of polymer onto the polymerization vessel wall was hardly observed.

Comparative Example 8

The same evaluation as in the polymerization evaluation of Example 18 was carried out except that the antifouling agent (Q-13) was not used.

After completion of polymerization, a significant amount of adhesion of polymer onto the polymerization vessel wall was observed.

Comparative Example 9

The same evaluation as in the polymerization evaluation of Example 18 was carried out except that, instead of the antifouling agent (Q-13), 0.12 g of CHEMISTAT-2500® (Sanyo Chemical Industries, Ltd.) was used.

After completion of polymerization, a significant amount of adhesion of polymer onto the polymerization vessel wall was observed.

From these results, it is understood that the polyoxyalkylene polymer has a better effect of remediation of fouling onto the polymerization vessel wall compared with the conventionally-known antistatic agent even if it is used under gas-phase polymerization conditions.

The disclosure of Japanese Application No. 2009-089424 is incorporated by reference here in its entirety.

All documents, patent applications, and technical standards mentioned herein were incorporated by reference to the same extent as if each individual document, patent application and technical standard was specifically and individually indicated to be incorporated by reference.

The invention claimed is:

1. A method for preventing fouling in chemical equipment, comprising adding an antifouling agent which comprises a polyoxyalkylene polymer represented by the following general Formula (1) or the following general formula (13) and having a number average molecular weight of 30,000 or less to a component in the chemical equipment:,

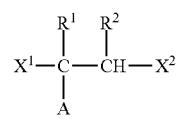 (1)

wherein, in the general formula (1), A represents a group in which olefins having 2 to 20 carbon atoms are homopolymerized or copolymerized and which has a number average molecular weight of from 400 to 10,000; $R^1$ and $R^2$ each represents a hydrogen atom or an alkyl group having 1 to 18 carbon atoms; and $X^1$ and $X^2$, which may be the same or different, each represents a group represented by the following general formula (2) or the following general formula (4):

$$-E-X^3 \qquad (2)$$

wherein, in the general formula (2), E represents an oxygen atom or a sulfur atom; and $X^3$ represents a polyalkylene glycol group or a group represented by the following general formula (3):

$$-R^3-(G)_m \qquad (3)$$

wherein, in the general formula (3), $R^3$ represents a hydrocarbon group having a valency of m+1; G may be the same or different and represents a group of $-OX^4$ or $-NX^5X^6$, wherein $X^4$, $X^5$, and $X^6$ each represents a polyalkylene glycol group; and m is the bonding number of G and is an integer in a range of from 1 to 10:

 (4)

wherein, in the general formula (4), $X^7$ and $X^8$, which may be the same or different, each represents a polyalkylene glycol group or a group represented by the general formula (3'):

$$-R^{3'}-(G')_{m'} \qquad (3')$$

wherein, in the general formula (3'), $R^{3'}$ represents a hydrocarbon group having a valency of m'+1; G' may be the same or different and represents a group of $-OX^{4'}$ or $-NX^{5'}X^{6'}$, wherein $X^{4'}$, $X^{5'}$, and $X^{6'}$ each represents a polyalkylene glycol group; and m' is the bonding number of G' and is an integer in a range of from 1 to 10,

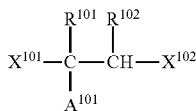

(13)

wherein, in the general formula (13), $A^{101}$ represents a group in which olefins having 2 to 20 carbon atoms are homopolymerized or copolymerized and which has a number average molecular weight of from 500 to 10,000; $R^{101}$ and $R^{102}$ each represents a hydrogen atom or an alkyl group having 1 to 18 carbon atoms; one of $X^{101}$ or $X^{102}$ represents a hydrogen atom, a group represented by the following general formula (14), or a group represented by the following general formula (15), and the other represents a group represented by the following general formula (16):

(14)

wherein, in the general formula(14), $E^{101}$ represents an oxygen atom or a sulfur atom, and $R^{104}$ represents a hydrogen atom, a hydrocarbon group, or an acyl group:

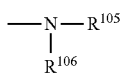

(15)

wherein, in the general formula(15), $R^{105}$ and $R^{106}$, which may be the same or different, each represents a hydrocarbon group:

(16)

wherein, in the general formula(16), $E^{102}$ represents an oxygen atom or a sulfur atom, and $X^{104}$ represents a polyalkylene glycol group.

2. The method for preventing fouling of claim 1, wherein the chemical equipment is equipment for producing polyolefin and the component in the chemical equipment is a component comprising α-olefin and a solid catalyst for polymerizing olefin.

3. The method for preventing fouling of claim 1, wherein the chemical equipment is equipment which produces polyolefin, the component in the chemical equipment is a component comprising α-olefin, and the method comprises adding the antifouling agent to the component in the chemical equipment together with a solid catalyst for polymerizing olefin.

4. The method for preventing fouling of claim 1, wherein the chemical equipment is equipment for producing polyolefin, the component in the chemical equipment is a component comprising α-olefin and a composition comprising the antifouling agent, and the method comprises adding a solid catalyst for polymerizing olefin to the component in the chemical equipment.

5. The method for preventing fouling of claim 1, wherein the component in the chemical equipment is in a gaseous state.

6. The method for preventing fouling of claim 1, wherein the component in the chemical equipment is in a liquid state.

7. The method for preventing fouling of claim 1, wherein the antifouling agent is added in either an intermittent manner or in a continuous manner.

8. The method for preventing fouling of claim 1, wherein $X^1$ or $X^2$ in the general formula (1) is a group represented by the following general formula (5):

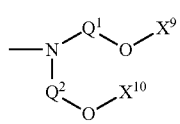

(5)

wherein, in the general formula (5), $X^9$ and $X^{10}$, which may be the same or different, each represents a polyalkylene glycol group; and $Q^1$ and $Q^2$, which may be the same or different, each represents a divalent alkylene group.

9. The method for preventing fouling of claim 1, wherein, in the general formula (1), $X^1$ and $X^2$ each represents a group represented by the following general formula (6):

—O—$X^{11}$ (6)

wherein, in the general formula(6), $X^{11}$ represents a polyalkylene glycol group.

10. The method for preventing fouling of claim 1, wherein the polyoxyalkylene polymer represented by the general formula (1) and having a number average molecular weight of 30,000 or less is a polyoxyalkylene polymer represented by the following general formula (7) and having a number average molecular weight of 30,000 or less:

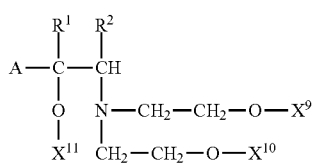

(7)

wherein, in the general formula (7), A represents a group in which olefins having 2 to 20 carbon atoms are homopolymerized or copolymerized and which has a number average molecular weight of from 400 to 10,000; $R^1$ and $R^2$ each represents a hydrogen atom or an alkyl group having 1 to 18 carbon atoms; and $X^9$, $X^{10}$ and $X^{11}$, which may be the same or different, each represents a polyalkylene glycol group.

11. The method for preventing fouling of claim 1, wherein A has a number average molecular weight of from 400 to 2,000.

* * * * *